(12) United States Patent
Villa et al.

(10) Patent No.: US 8,478,728 B2
(45) Date of Patent: Jul. 2, 2013

(54) ONLINE DATING WITH PRIVATE SUPPORT GROUPS

(75) Inventors: Ivan Villa, Morgan Hill, CA (US); Joe Raio, Pompano Beach, FL (US); Jason Rodman, Coconut Creek, FL (US)

(73) Assignee: True Union, LLC, Morgan Hill, CA (US)

(*) Notice: Subject to any disclaimer, the term of this patent is extended or adjusted under 35 U.S.C. 154(b) by 78 days.

(21) Appl. No.: 12/821,165

(22) Filed: Jun. 23, 2010

(65) Prior Publication Data

US 2011/0153669 A1    Jun. 23, 2011

Related U.S. Application Data

(60) Provisional application No. 61/219,880, filed on Jun. 24, 2009.

(51) Int. Cl.
*G06F 7/00* (2006.01)

(52) U.S. Cl.
USPC .......................................... 707/666

(58) Field of Classification Search
USPC ................................. 707/706, 666
See application file for complete search history.

(56) References Cited

U.S. PATENT DOCUMENTS

| | | | |
|---|---|---|---|
| 7,454,357 B2 | 11/2008 | Buckwalter et al. | |
| 7,669,123 B2 | 2/2010 | Zuckerberg et al. | |
| 7,725,492 B2 | 5/2010 | Sittig et al. | |
| 2006/0173963 A1* | 8/2006 | Roseway et al. | 709/206 |
| 2007/0192106 A1 | 8/2007 | Zilca | |
| 2008/0092064 A1 | 4/2008 | Zilca | |
| 2009/0106043 A1 | 4/2009 | Buckwalter et al. | |
| 2010/0293476 A1* | 11/2010 | Rosenblum et al. | 715/753 |

* cited by examiner

*Primary Examiner* — Truong Vo
(74) *Attorney, Agent, or Firm* — Smith Risley; Steven P. Wigmore

(57) ABSTRACT

Various embodiments of computer systems, methods, and computer programs are disclosed for sharing information in an online dating platform. One embodiment is an online dating computer system comprising a server, an online dating matching component, and a dater support component. The server is configured to communicate with one or more computing devices via a communication network. The server comprises a processor and a memory. The online dating matching component and the dater support component are embodied in the memory and executed by the processor. The online dating matching component is configured to provide a matching service for online dater data and further configured to enable communications among online dater profiles established in memory. The dater support component is configured to provide dating assistance to profiles of online daters, via the online dating computer system, from messages originating from a dater support group associated with the online dater, the dater support group comprising one or more invited supporters.

12 Claims, 41 Drawing Sheets

| | |
|---|---|
| Location | , 33432 |
| Marital Status | Single – never married |
| Living Situation | With pets |
| Has Kids | No |
| Wants (more) Kids | Yes |
| Religion | Jewish |
| Attends Services | Only on holidays |
| Languages Spoken | English |
| | |
| Interests | Arts, Dining, listening to Music |
| Astrological Sign | Leo (July 23 – Aug 22) |
| Political Views | I'll tell you later |
| Sense of Humor | Friendly |
| Social Setting | The life of the party |
| TV Watching Habits | Couch Potato |

Within 50 miles of , 33432
Single – never married
Alone test
test
test
test
test

My interests:
- Theater
- Computers / Internet
- Crafts
- Health/Fitness
- Travel
- Gaming
- Playing Music
- Cooking
- Gardening
- Playing Sports My astro sign: [Capricorn (Dec 22 - Jan 19)]

My political views: [Very conservative]

My sense of humor:
- Friendly
- Campy / Cheesy
- Obscure
- Clever / Quick Witted
- Goofy
- Raunchy
- Dry / Sarcastic
- Slapstick
- Other I'm:
- The life of the party
- Social Butterfly
- Better in small groups
- Shy at first, but warm up quickly
- Side kick
- Comic Relief My TV watching habits:
- Couch Potato
- Sports Nut
- Movies
- Documentaries
- TiVo is my best friend
- Reality show addict
- Sitcoms
- Soaps, soaps, soaps
- Channel Hopper
- News Junkie
- Dramas
- I want to be on a game show too
- I don't own a TV

Occupations:
○ Politics / Government / Military
○ Technical / Science / Engineering
○ Food Service
○ No Preference
○ Sales / Marketing
○ Transportation
○ Other Income level: [No Preference]

Marital Status:
○ Single - never married
○ Separated
○ No Preference
○ Divorced
○ Rarely
○ Widowed
○ Never Living Situation:
○ Alone
○ With pets
○ There is a party every night
○ With kids
○ With roommate(s)
○ No Preference
○ With parents
○ Family and friends visit often Has kids:
○ No
○ Yes - but not at home
○ Yes - at home full-time
○ No Preference
○ Yes - at home part-time Wants more kids:
○ No
○ No Preference
○ Yes
○ Not sure Religion:
○ Buddhist/Taoist
○ Jewish
○ Christian
○ Islam
○ Hindu
○ None/Agnostic

Religion:
- ☐ Buddhist/Taoist
- ☐ Jewish
- ☐ Christian / Protestant
- ☐ Christian / LDS
- ☐ Spiritual but not religious
- ☐ No Preference
- ☐ Christian
- ☐ Islam
- ☐ Christian / Catholic
- ☐ Christian / Other
- ☐ Scientology
- ☐ Hindu
- ☐ None/Agnostic
- ☐ Atheist
- ☐ Not Religious
- ☐ Other

Attends Services:
- ☐ More than once a week
- ☐ Only on holidays
- ☐ No Preference
- ☐ Weekly
- ☐ Rarely
- ☐ Monthly
- ☐ Never

Languages Spoken:
- ☐ English
- ☐ Italian
- ☐ Portuguese
- ☐ Arabic
- ☐ Hindi
- ☐ No Preference
- ☐ French
- ☐ Dutch
- ☐ Chinese
- ☐ Russian
- ☐ Tagalog
- ☐ German
- ☐ Spanish
- ☐ Japanese
- ☐ Hebrew
- ☐ Urdu

Interests:
- ☐ Arts
- ☐ Dining
- ☐ Listening to Music
- ☐ Reading
- ☐ Theater
- ☐ Computers / Internet
- ☐ Crafts
- ☐ Health/Fitness
- ☐ Community Service
- ☐ Family
- ☐ Outdoor Activities
- ☐ Religion / Spirituality
- ☐ Travel
- ☐ Gaming
- ☐ Playing Music
- ☐ No Preference
- ☐ Dancing
- ☐ Movies
- ☐ Photography
- ☐ Watching Sports
- ☐ Cooking
- ☐ Gardening
- ☐ Playing Sports

Astrological Sign:
- ☐ Aries (March 21 - April...) ☐ Taurus (April 20...) ☐ Gemini (May 21 - June...

Astrological Sign:
- Aries (March 21 - April 19)
- Taurus (April 20 - May 20)
- Gemini (May 21 - June 21)
- Cancer (June 22 - July 22)
- Leo (July 23 - Aug 22)
- Virgo (Aug 23 - Sept 22)
- Libra (Sept 23 - Oct 23)
- Scorpio (Oct 24 - Nov 21)
- Sagittarius (Nov 22 - Dec 21)
- Capricorn (Dec 22 - Jan 19)
- Aquarius (Jan 20 - Feb 18)
- Pisces (Feb 19 - March 20)
- No Preference

Political Views:
- Very conservative
- Conservative
- Middle of the road
- Liberal
- Very liberal
- Not political
- No Preference

Sense of Humor:
- Friendly
- Clever / Quick Witted
- Dry / Sarcastic
- Campy / Cheesy
- Goofy
- Slapstick
- Obscure
- Raunchy
- Other
- No Preference

Social Setting:
- The life of the party
- Shy at first, but warm up quickly
- Home Body
- Social Butterfly
- Side kick
- Flirt
- Better in small groups
- Comic Relief
- No Preference

TV Watching Habits:
- Couch Potato
- Reality show addict
- News Junkie
- Sports Nut
- Sitcoms
- Dramas
- Movies
- Soaps, soaps, soaps
- I want to be on a game show too
- Documentaries
- Channel Hopper
- I don't own a TV
- TV is my best
- No Preference

TV Watching Habits:
- Couch Potato
- Sports Nut
- Movies
- Documentaries
- Tivo is my best friend
- Reality show addict
- Sitcoms
- Soaps, soaps, soaps
- Channel Hopper
- No Preference
- News Junkie
- Dramas
- I want to be on a game show too
- I don't own a TV Advanced Search:

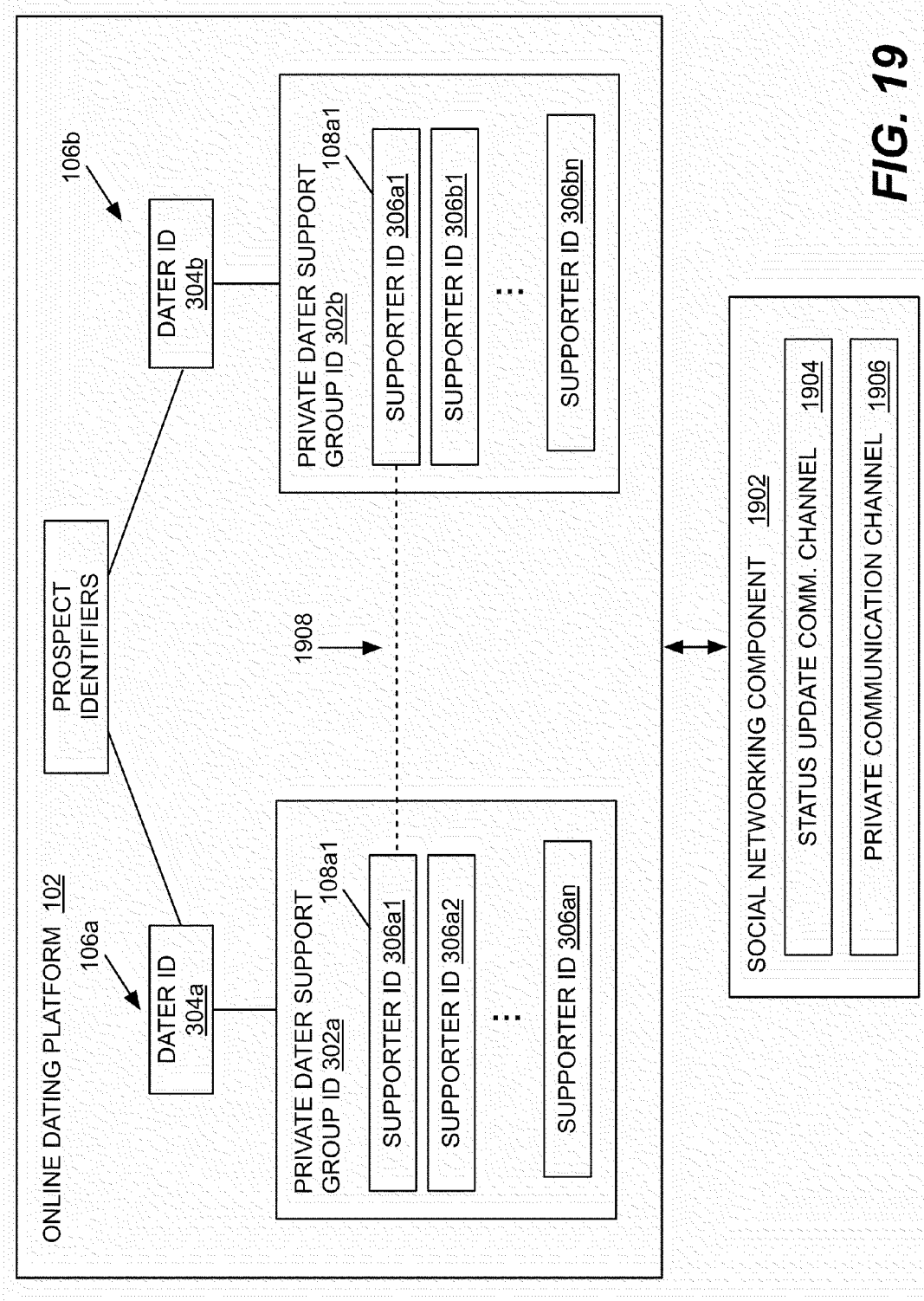

ONLINE DATING WITH PRIVATE SUPPORT GROUPS

CROSS-REFERENCE TO RELATED APPLICATIONS

This application claims the benefit of the priority of U.S. Provisional Patent Application No. 61/219,880 entitled "Dual Social Networking Platforms" and filed Jun. 24, 2009, which is hereby incorporated by reference in its entirety.

BACKGROUND

There are a number of commercially successful online dating systems that enable individuals (referred to as "online daters" or "daters") to make contact and communicate with each other via communication networks (e.g., the Internet), usually with the objective of developing a personal romantic relationship. A typical online dating system requires prospective members to create a personal profile including various types of personal information, prospect criteria, etc. A matchmaking service identifies potential matches or candidates (referred to as "prospects"), and the online dating system provides various tools and features for enabling a dater to communicate with prospects and search for additional prospects.

Despite the many advantages and commercial success of existing online dating solutions, there remains a need in the art for improved online dating systems, methods, and computer programs.

SUMMARY

Various embodiments of computer systems, methods, and computer programs are disclosed for sharing information in an online dating platform. One embodiment is an online dating computer system comprising a server, an online dating matching component, and a dater support component. The server is configured to communicate with one or more computing devices via a communication network. The server comprises a processor and a memory. The online dating matching component and the dater support component are embodied in the memory and executed by the processor. The online dating matching component is configured to provide a matching service for online dater data and further configured to enable communications among online dater profiles established in memory. The dater support component is configured to provide dating assistance to profiles of online daters, via the online dating computer system, from messages originating from a dater support group associated with the online dater, the dater support group comprising one or more invited supporters.

Another embodiment is method for sharing information in an online dating computer system. One such method comprises: receiving first dater registration information with an online dating computer system; creating a first dater profile with the first dater registration information; storing the first dater profile in a database; a matching engine generating a plurality of prospects for the first dater which match the first dater profile, each of the plurality of prospects having a corresponding second dater profile stored in the database; sending messages for inviting one or more supporters to a private dater support group; creating the private dater support group in memory; receiving one or more requests originating from the private dater support group to access at least a portion of information stored in the plurality of second dater profiles associated with the prospects matching the first dater profile; and granting access, in response to the one or more requests, to at least a portion of information stored in the plurality of second dater profiles associated with the prospects matching the first dater profile.

Another method comprises: creating a first private dater support group comprising a profile of a first dater and a first group of one or more profiles of supporters invited by the first dater to provide dating assistance; an online dating computer system providing a private communication channel for enabling the profiles of the first group of supporters to provide prospect information about a first group of prospects associated with the first dater; the online dating computer system monitoring the private communication channel; receiving from a first profile of the first group of supporters via the private communication channel the prospect information about a first prospect associated with the first dater; and sharing the received prospect information via the private communication channel with the profile of the first dater and other profiles of the first group of supporters.

BRIEF DESCRIPTION OF THE DRAWINGS

FIG. 7*c* is a third portion of the exemplary screen shot of FIG. 7*a*.

FIG. 8*b* is a second portion of the exemplary screen shot of FIG. 8*a*.

FIG. 8*c* is a third portion of the exemplary screen shot of FIG. 8*a*.

FIG. 12b is a second portion of the exemplary screen shot of FIG. 12a.

FIG. 12c is a third portion of the exemplary screen shot of FIG. 12a.

FIG. 12d is a fourth portion of the exemplary screen shot of FIG. 12a.

FIG. 12e is a fifth portion of the exemplary screen shot of FIG. 12a.

FIG. 12f is a sixth portion of the exemplary screen shot of FIG. 12a.

FIG. 13b is a second portion of the exemplary screen shot of FIG. 13a.

FIG. 14b is a second portion of the exemplary screen shot of FIG. 14a.

FIG. 16b is a second portion of the exemplary screen shot of FIG. 16a.

FIG. 17b is a second portion of the exemplary screen shot of FIG. 17a.

FIG. 18a is a first portion of an exemplary screen shot displaying a prospect profile to a supporter.

FIG. 18b is a second portion of the exemplary screen shot of FIG. 18a.

FIG. 18c is a third portion of the exemplary screen shot of FIG. 18a.

FIG. 19 is a data diagram illustrating an exemplary data structure for sharing information between supporters and daters in the online dating platform of FIG. 1.

DETAILED DESCRIPTION

Various embodiments of computer systems, devices, methods, and computer programs are disclosed for providing an online dating platform. As mentioned above and described below in more detail with reference to the embodiments illustrated in FIGS. 1-20, the online dating platform comprises a dater support component that enables online daters to invite friends or other individuals to join a private dater support group. In general, members of the private dater support group (referred to as "supporters") may access information associated with the dater's prospects and/or profile and assist the dater with the online dating experience in various ways. For example, in an embodiment, the dater support component may be configured to enable supporters to provide recommendations or feedback about the dater's profile, help the dater select and/or evaluate prospects, communicate or otherwise interact with the dater and/or other supporters, or provide any other desirable functions to assist the dater.

Figure 1:
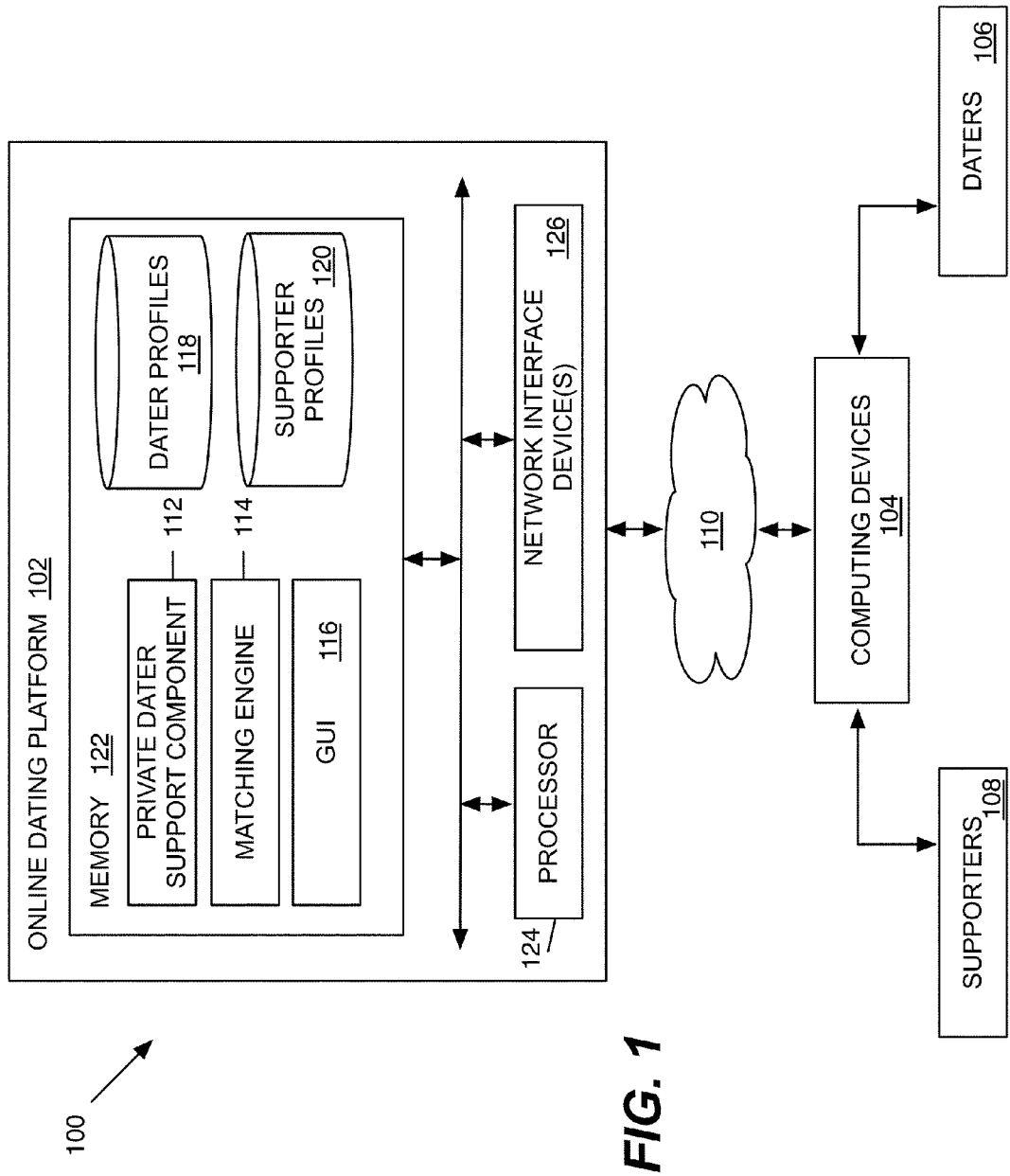
FIG. 1 is a block diagram of an embodiment of a computer system for implementing an online dating platform with private support groups.

FIG. 1 illustrates a computer system 100 representing an exemplary working environment for implementing the dater support component. The computer system 100 generally comprises an online dating platform 102 that provides online dating services to a plurality of daters 106 and supporters 108. Daters 106 and supporters 108 access the online dating services with a computing device 104 in communication with the online dating platform 102 via one or more communication networks 110. The network(s) 110 may support wired and/or wireless communication via any suitable protocols, including, for example, the Internet, the Public Switched Telephone Network (PSTN), cellular or mobile network(s), local area network(s), wide area network(s), or any other suitable communication infrastructure.

The computing devices 104 may comprise any desirable computing device, which is configured to communicate via the networks 110, including, for example, a personal computer, a desktop computer, a laptop computer, a mobile computing device, a portable computing device, a smart phone, a cellular telephone, a web-enabled electronic book reader, a tablet computer, or any other computing device capable of communicating with the online dating platform 102. The computing device 104 may include client software (e.g., a browser, plug-in, or other functionality) configured to facilitate communication with the online dating platform 102 and receive the online dating services.

The online dating platform 102 may comprise one or more servers or other computer systems having one or more network interface devices 126 configured to communicate with computing devices 104 via network(s) 110. In the embodiment illustrated in FIG. 1, the online dating platform 102 comprises a private dater support component 112, a matching engine 114, a graphical user interface 116, and one or more databases for storing dater profiles 118 and supporter profiles 120, any of which may be stored in a memory 122 and executed via processor(s) 124. The private dater support component 112 and the matching engine 114 generally comprise the logic or functionality for providing the online dating services to supporters 108 and daters 106. The matching engine 114 may comprise an online dating matching component configured to provide the matching service to the daters 106 and enable matched online daters to communicate with each other via any desirable communication tools. One of ordinary skill in the art will appreciate that the private dater support component 112 and the matching engine 114 (and any associated or other modules described herein) may be implemented in software, hardware, firmware, or a combination thereof. In the embodiment of FIG. 1, the logic is implemented in software or firmware that is stored in the memory 122 and executed by a suitable instruction execution system (e.g., processor(s) 124). In software or firmware embodiments, the logic may be written in any suitable computer language. In hardware embodiments, the logic may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
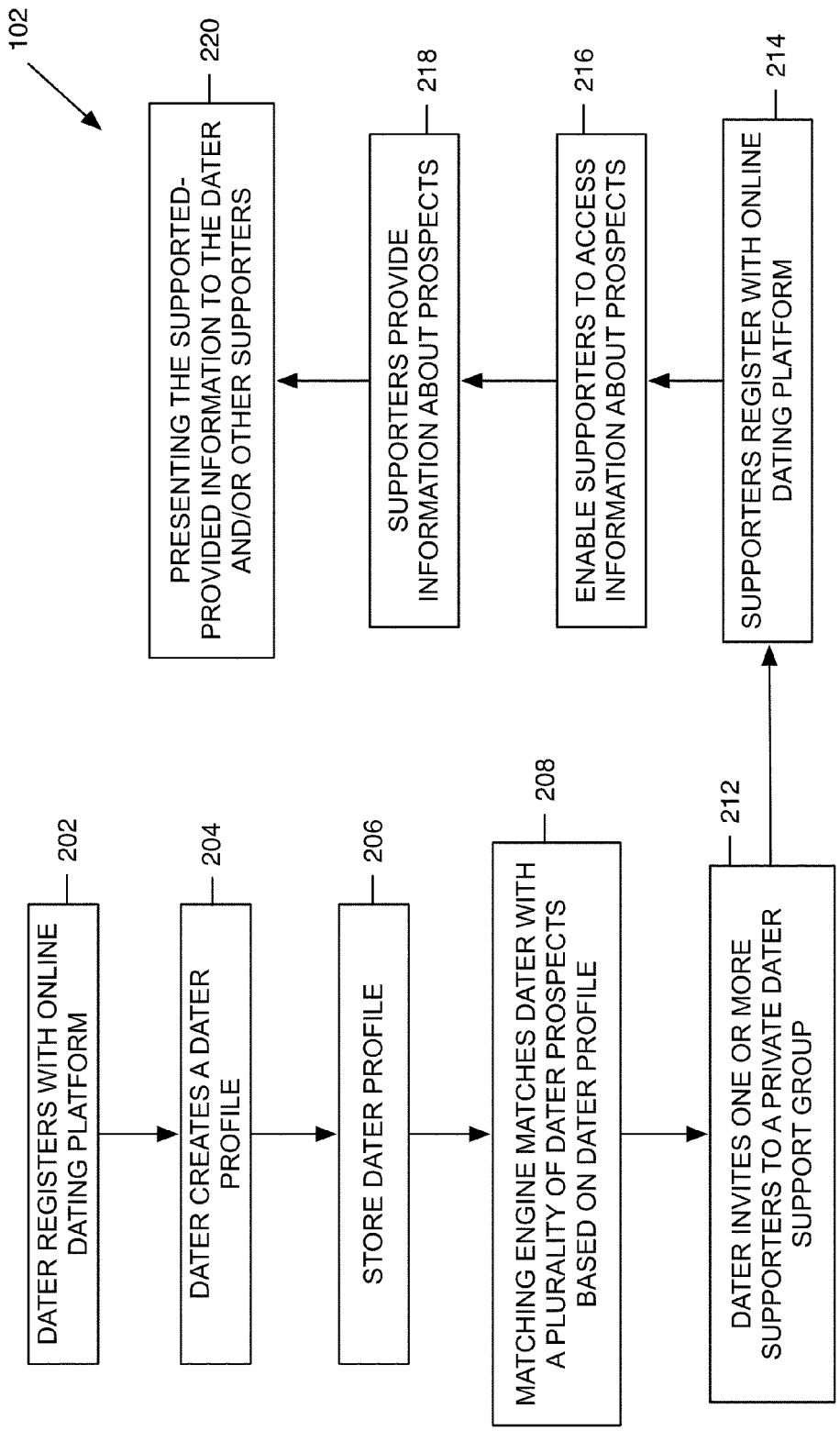
FIG. 2 is a flowchart illustrating an embodiment of a method for implementing an online dating platform with private support groups.

FIG. 2 illustrates an embodiment of the architecture, operation, and/or functionality of certain aspects of the online dating platform 102 (e.g., the matching engine 114 and the private dater support component 112). At block 202, a dater 106 registers with the online dating platform 102. At block 204, the dater 106 creates an associated dater profile 118, which may be stored in memory 122 (block 206). At block 208, the matching engine 114 matches the dater 106 with a plurality of other daters (i.e., prospects) based at least on information stored in the dater profile 118. It should be appreciated that the matching engine 114 may implement various algorithms for automatically or manually matching daters based on any desirable data, criteria, variables, parameters, etc. stored in the dater profiles 118 or other available data, such as, for example, surveys or any information related to personalities, interests, beliefs, socioeconomic status, religion, appearance, ethnic background, lifestyle, education, or any other information for predicting relationship success.

Figure 3:
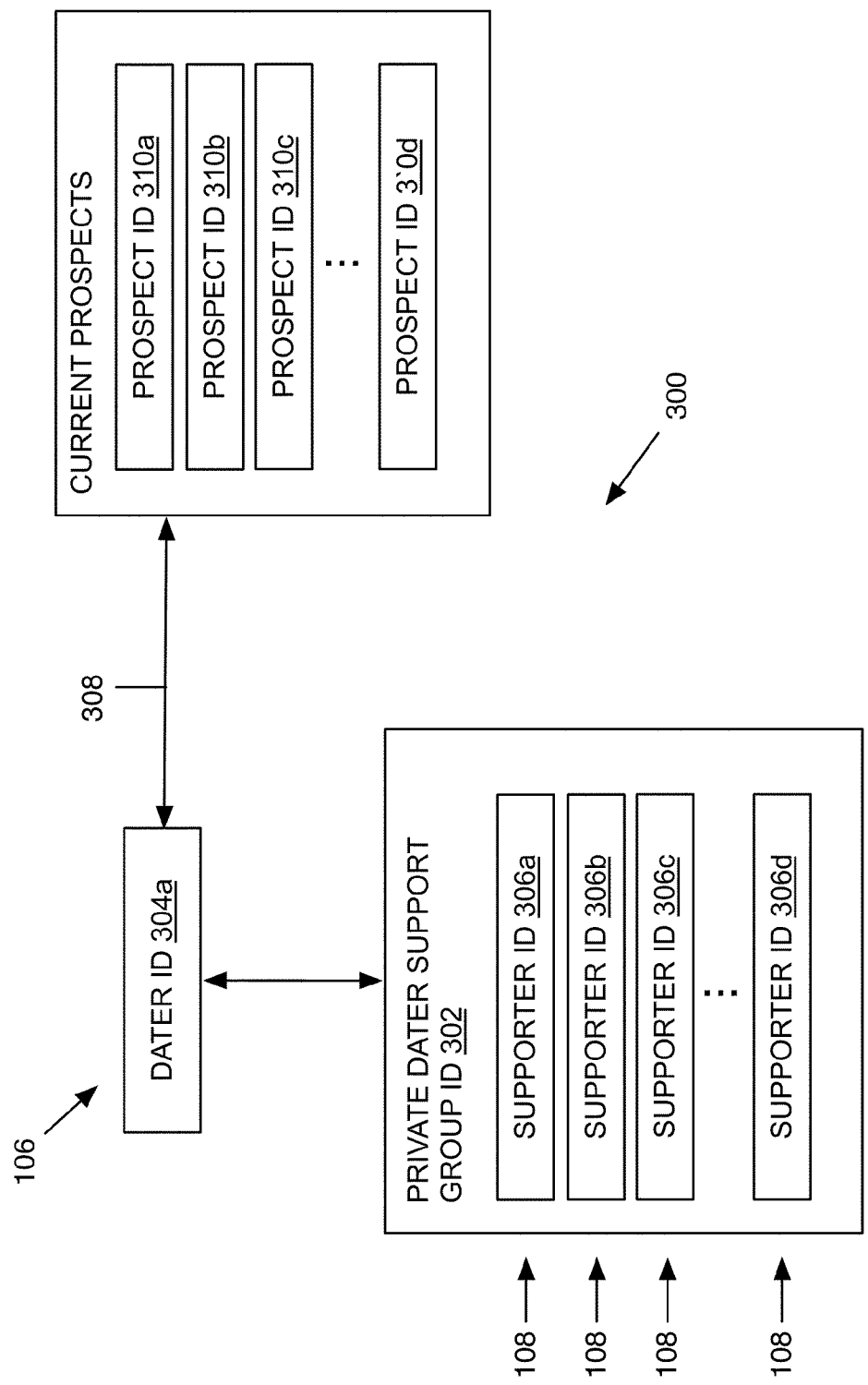
FIG. 3 is a block diagram illustrating an embodiment of a private dater support group in the online dating platform of FIG. 1.

At block 212, the private dater support component 112 enables the dater 106 to invite one or more supporters 108 to the online dating platform 102. Supporters 108 may be required to register with the online dating platform 102 (block 214). The online dating platform 102 may generate a private dater support group 300 (FIG. 3) comprising the originating dater 106 and any associated supporters 108 (collectively referred to as "members" of the private dater support group 300). The members may be identified with unique data identifiers to enable the online dating platform 102 to manage and control the creation and operation of the private dater support group 300. In the embodiment of FIG. 3, the originating dater 106 is identified by a unique dater identifier 304, and supporters 108 are identified by a unique supporter identifier 306. As illustrated by reference arrow 308, the private dater support group 300 may be mapped to the dater's current prospects by unique identifiers 310. It should be appreciated that the private data support group 300 may be implemented using any desirable data structure and/or database technologies.

Referring again to FIG. 2, at block 216, the private dater support component 112 enables the supporters 108 in the private dater support group 300 to access information about the dater's prospects or any other desirable information associated with the dater's profile 118. In an embodiment, the supporters 108 may provide information about the prospects (block 218) to the online dating platform 102. As described below in more detail, the supporters 108 may view prospect profiles, provide comments, submit links, and/or submit a rating or ranking for the prospect. At block 220, the private dater support component 112 presents the information received from the supporter 108 to the associated dater 106, as well as the other supporters 108 in the private dater support group 300. In an embodiment, the prospects are not permitted to access the supporter-provided information, although in alternative embodiments it may also be shared with the prospects.

Various aspects of the online dating platform 102 are described in more detail with reference to the user interface screen shots of FIGS. 4-18. The functionality represented in the exemplary screen shots may be implemented via, for example, the graphical user interface 116 or other user interfaces, websites, presentation technologies, etc.

Figure 4:
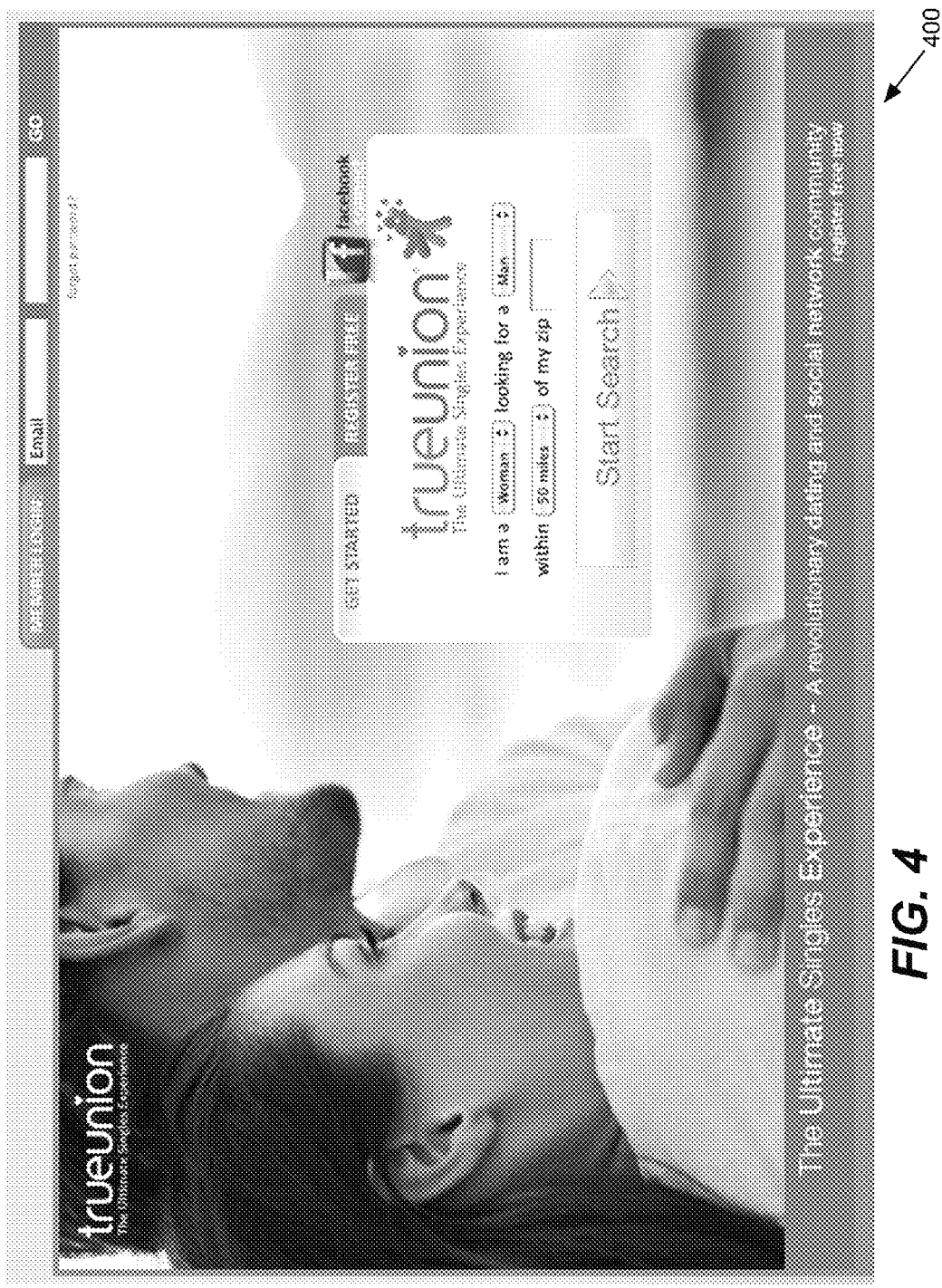
FIG. 4 is an exemplary screen shot of a login screen for logging into the online dating platform of FIG. 1.

FIG. 4 is an exemplary screen shot of a login screen 400 for logging into the online dating platform 102. Existing daters 106 and supporters 108 may log in via their email address and password or via a third party service, application program interface (API), etc. Prospective daters 106 may also register via the login screen 400 or initiate a search without registering. After a dater 106 registers, additional screen shots may be displayed for enabling the dater 106 to invite supporters 108. Supporters 108 may be invited by any one of the following, or other methods: direct email address entry; email contact import; text messaging via Simple Messaging Service (SMS); paging messages; automated phone calls; social networking import; and any other similar or other communication channels. The online dating platform 102 may send a customized email to each invited supporter 108 indicating that they are being invited to assist the dater 106. The customized email may comprise a unique link coded to, for example, the supporter's email address, the dater's profile 118, and the private dater support group 300. The unique link may direct the supporter 108 to a separate webpage for enabling the supporter 108 to register with the online dating platform 102 and join the private dater support group 300. The supporter 108 may create a supporter profile 120, which is stored in memory 122, and subsequently used via login screen 400.

FIGS. 5*a*-13*b* illustrate various exemplary screen shots displayed to daters 106 that have registered with the online dating platform 102.

Figure 5A:
FIG. 5*a* is a first portion of an exemplary screen shot of a dater dashboard screen displayed to a dater.
Figure 5B:
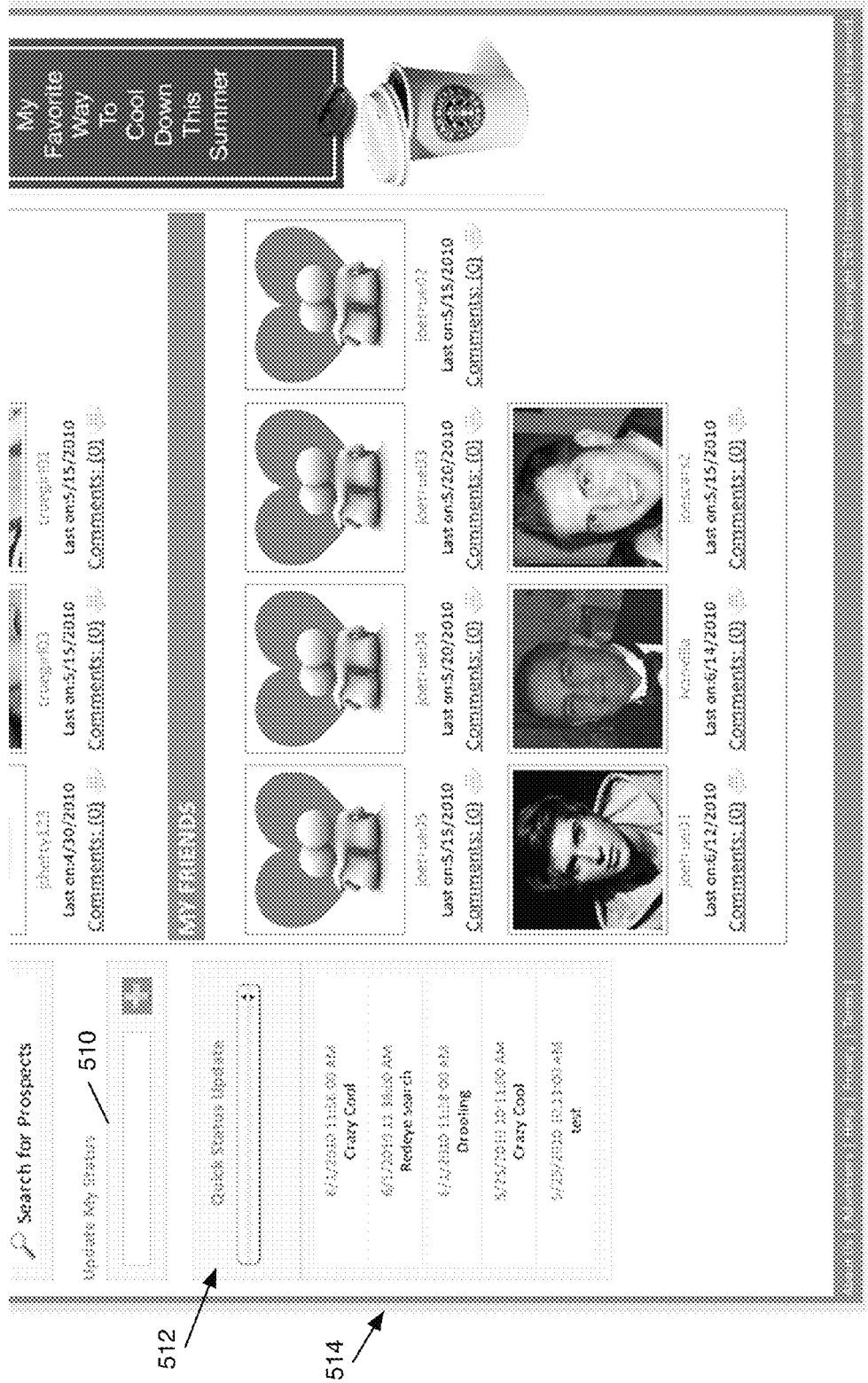
FIG. 5*b* is a second portion of the exemplary screen shot of FIG. 5*a*.

FIGS. 5*a* & 5*b* illustrate a dater dashboard screen 500 displayed to a dater 106. The dater dashboard screen 500 comprises a control menu 502, a my prospects display 504, a my friends display 506, a status update entry component 510, a quick status selection component 512, and a status update display feed 514. The control menu 502 displays user interface buttons or other mechanisms for enabling the dater 106 to manage various aspects of the dater's account. In an embodiment, the control menu 502 enables the dater 106 to manage the dater profile 118 (Manage My Profile component), manage prospects (Manage My Prospects component), manage supporters (Manage My Friends component), manage photos (Manage My Photos component), manage videos (Manage My Videos component), manage mail (Manage My Mail component), and search for prospects (Search for Prospects component).

The my prospects display 504 displays the dater's current list of prospects, and the my friends display 506 displays the current list of supporters 108. Prospects and supporters 108 may be represented by a photograph, avatar, or other media associated with their profile. Additional information may be displayed, including, for example, the individual's user name or a quick comment notification and link to the user's comments.

Figure 21:
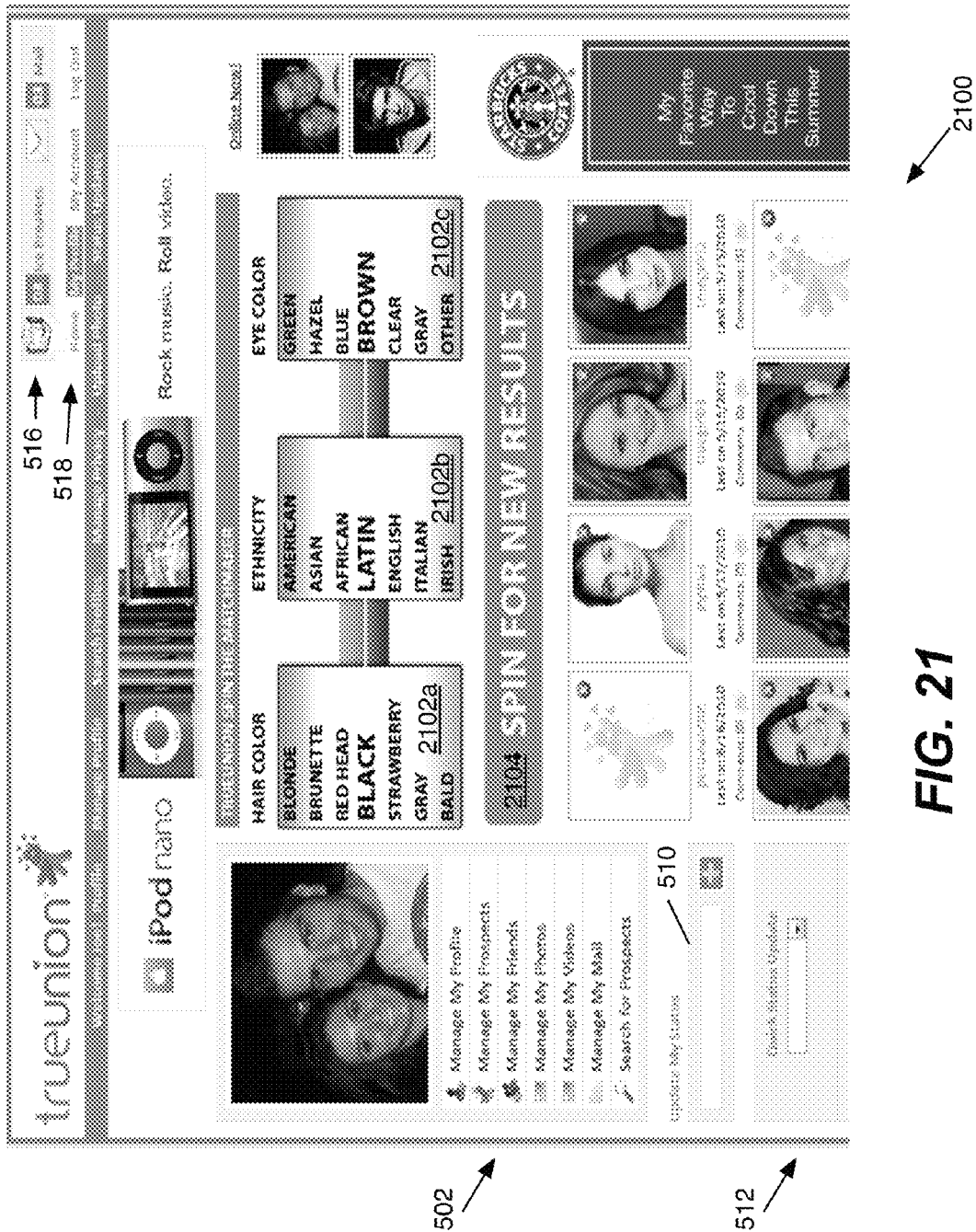
FIG. 21 is an exemplary screen shot of another embodiment of a dater dashboard screen including a slot machine functionality for initiating a prospect search and/or browsing matching prospects.

As illustrated in the exemplary screen shot 2100 of FIG. 21, the my prospects display 504 may further comprise a unique user interface control and prospect display functionality integrated with the matching engine 114, which enables the dater 106 to navigate through a list of matching prospects. The matching engine 114 may display the prospects such that the dater 106 may navigate or browse through the prospects from a single screen. The user interface control may be configured as a navigable wheel, circle, or other visual control mechanism for convenient and quick browsing of the prospect avatars. Furthermore, the matching service may be exposed to the dater 106 in a visually engaging manner. In an embodiment, the matching service may be presented with one or more rotating user interface components (e.g., components 2102*a*, 2102*b*, and 2102*c*—FIG. 21) to simulate, for example, a slot machine or other engaging visual metaphor. The dater 106 may initiate the matching service by selecting a user interface control (e.g., a visual representation of a slot machine handle, button 2104, etc.). The matching service may rotate or successively display a plurality of prospect images and/or avatars (or other information associated with the prospects) to simulate the progress of the matching algorithm. The prospects with the highest probability of being a match may be displayed in a final "static" state of the rotating user interface components. Furthermore, the dater 106 may navigate through the prospects using the rotating user interface components.

As described below in more detail, the online dating platform 102 may provide various types of communication channels, including any desirable social networking communication channels provided by an integrated social networking component (e.g., private communication channel 1906 and status update communication channel 1904—FIG. 19). The status update entry component 510 enables the dater 106 to post status updates to the status update communication channel 1904, which are shared with the dater's social networking contacts (e.g., supporters 108). The quick selection status component 512 may be configured as a drop-down selection menu with predetermined status updates for quick entry. The status update display feed 514 displays a log of the dater's recent status updates. One of ordinary skill in the art will appreciate that alternative or additional user interface controls may be implemented in any of the exemplary user interface screens or otherwise. For instance, in an embodiment, the status update display feed 514 and/or the quick selection status component 512 may be presented to the daters 106 and/or supporters 108 in, for example, the "What's Going On" tab (FIGS. 6*a* & 6*b*).

Dater dashboard screen 500 may further comprise a notification bar 516 and a navigation bar 518 (or other user interface controls) for convenient access to relevant information and functionality. The notification bar 516 may display mail notifications from prospects and/or supporters 108 or other communication notifications (e.g., chats, ice breakers from prospects, etc.). The navigation bar 518 provides convenient access to any of the following, or other, features, functions, or pages: Log Out; My Account; Home; Manage Profile; Search Profiles; Manage Privacy; Upload Photo; and Status Updates.

Figure 6A:
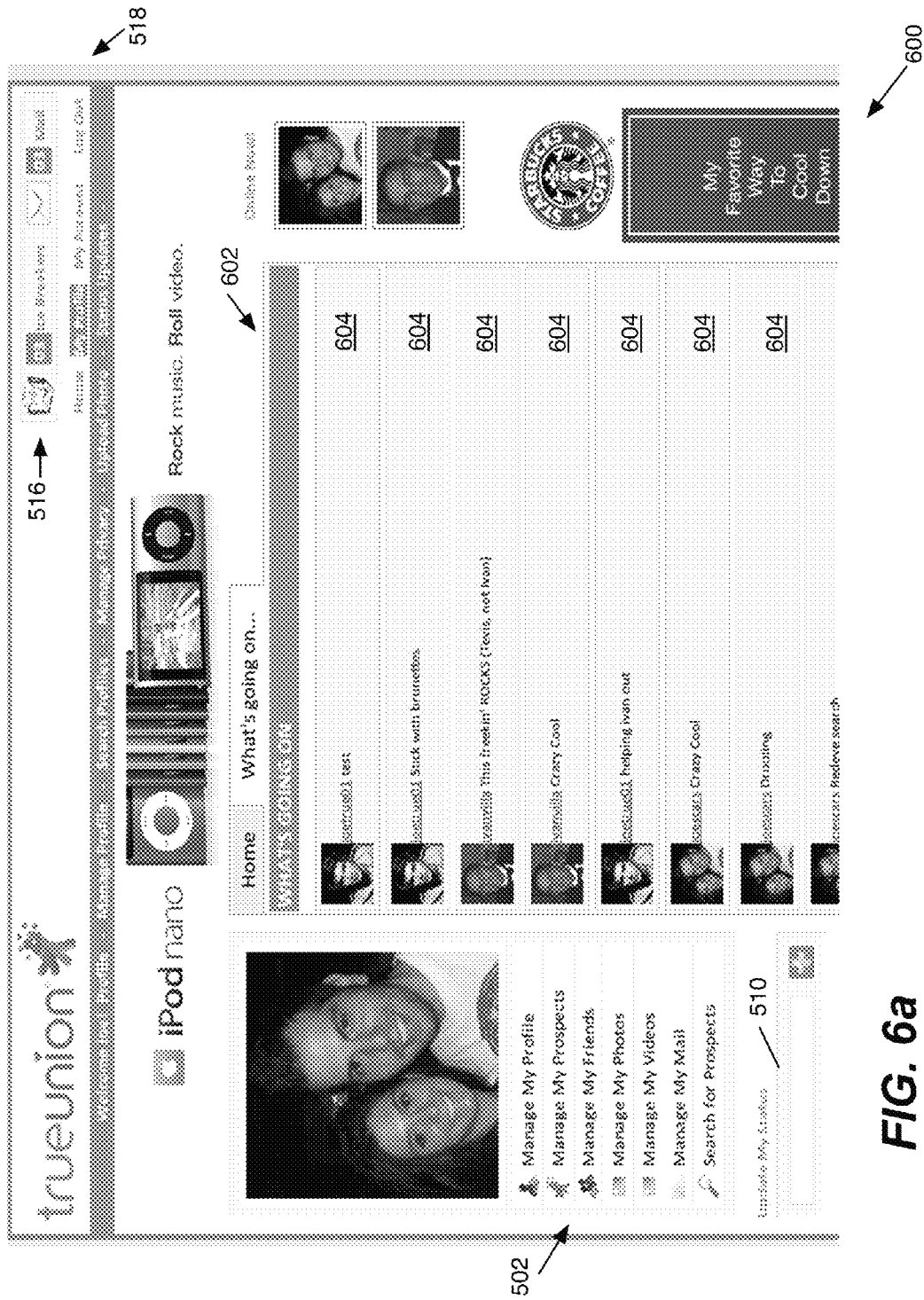
FIG. 6*a* is a first portion of an exemplary screen shot of a data feed displayed to a dater.
Figure 6B:
FIG. 6*b* is a second portion of the exemplary screen shot of FIG. 6*a*.

FIGS. 6*a* & 6*b* illustrate a data feed 602 displayed to a dater. The data feed 602 may be accessed by selecting the "What's Going On" tab in the dater dashboard screen 500. The data feed 602 may comprise an aggregate social networking feed for displaying items 604 from one or more communication channels. The data feed 602 may receive data from the private communication channel 1906 when supporters 108 provide information about the prospects, as well as status updates or other activities associated with social networking feeds, such as, the status update communication channel 1904. Items 604 may display an image of the user, the name of the user, and the content. The items 604 may be selectable by the dater 106 to view more detailed information. It should be further appreciated that the data feed 602 may be configured as a threaded feed that permits multiple comments to any item 604.

Figure 7A:
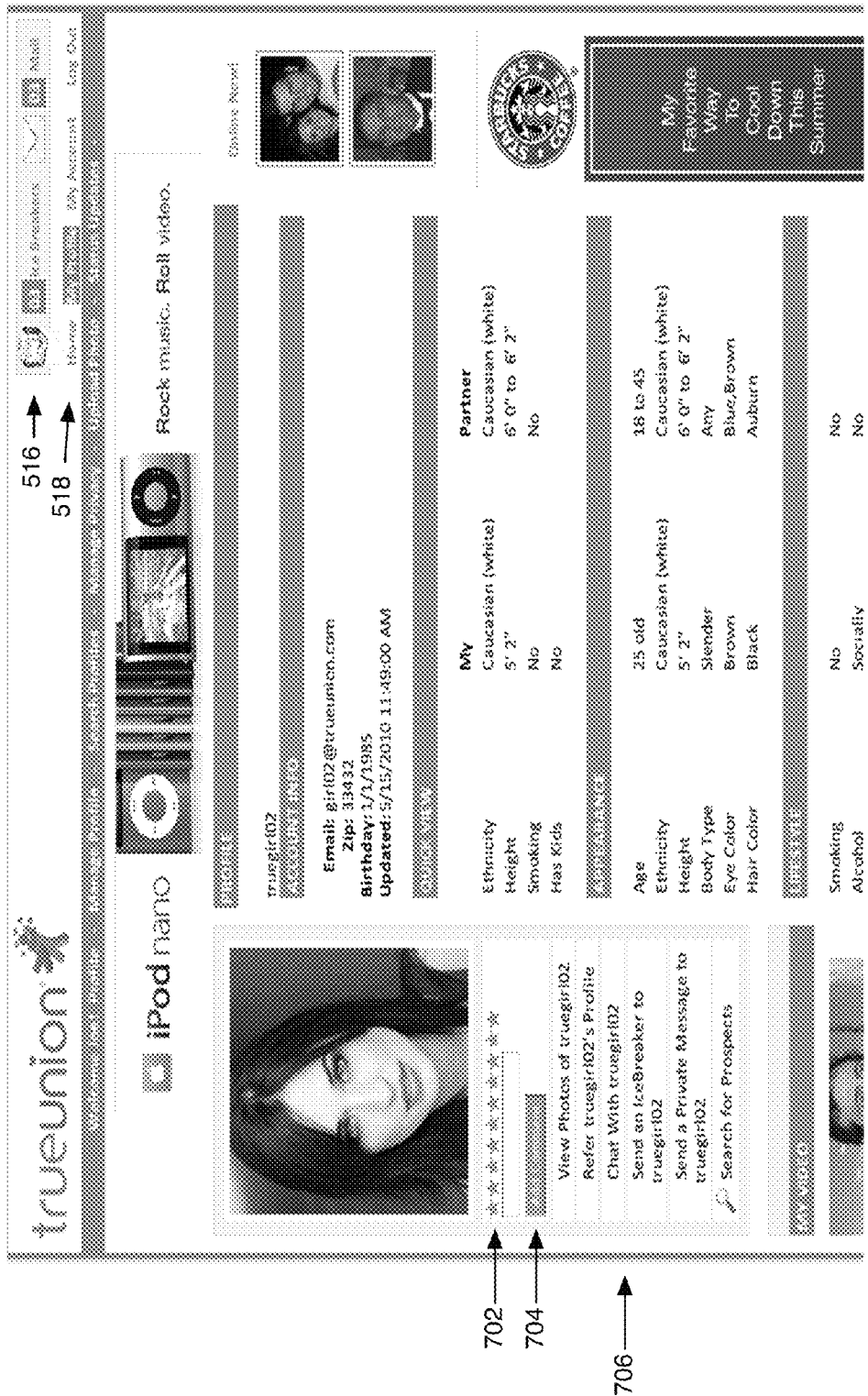
FIG. 7*a* is a first portion of an exemplary screen shot of a prospect profile displayed to a dater.
Figure 7B:
FIG. 7*b* is a second portion of the exemplary screen shot of FIG. 7*a*.

FIG. 7*a*-7*c* illustrate a prospect profile 700 displayed to a dater 106. The prospect profile 700 may display various information about the prospect, including any of the following or other parameters or information: account info; quick view of prospect data; appearance parameters; lifestyle parameters; home life parameters; personality parameters; interests information; and occupation information. The prospect profile 700 may comprise a ranking component 702, a comment input component 704, and a prospect menu 706. The ranking component 702 enables the dater 106 to submit a ranking or rating for the displayed prospect. The comment input component 704 comprises a text input or other user interface mechanism for submitting comments about, or associated with, the displayed prospect. The prospect menu 706 exposes various tools for receiving additional information or interacting with the prospect. For example, the dater 106 may view photos of the prospect, refer the prospect profile to another user, or initiate communications with the prospect (e.g., chat, private message, ice breakers, etc.).

Figure 8A:
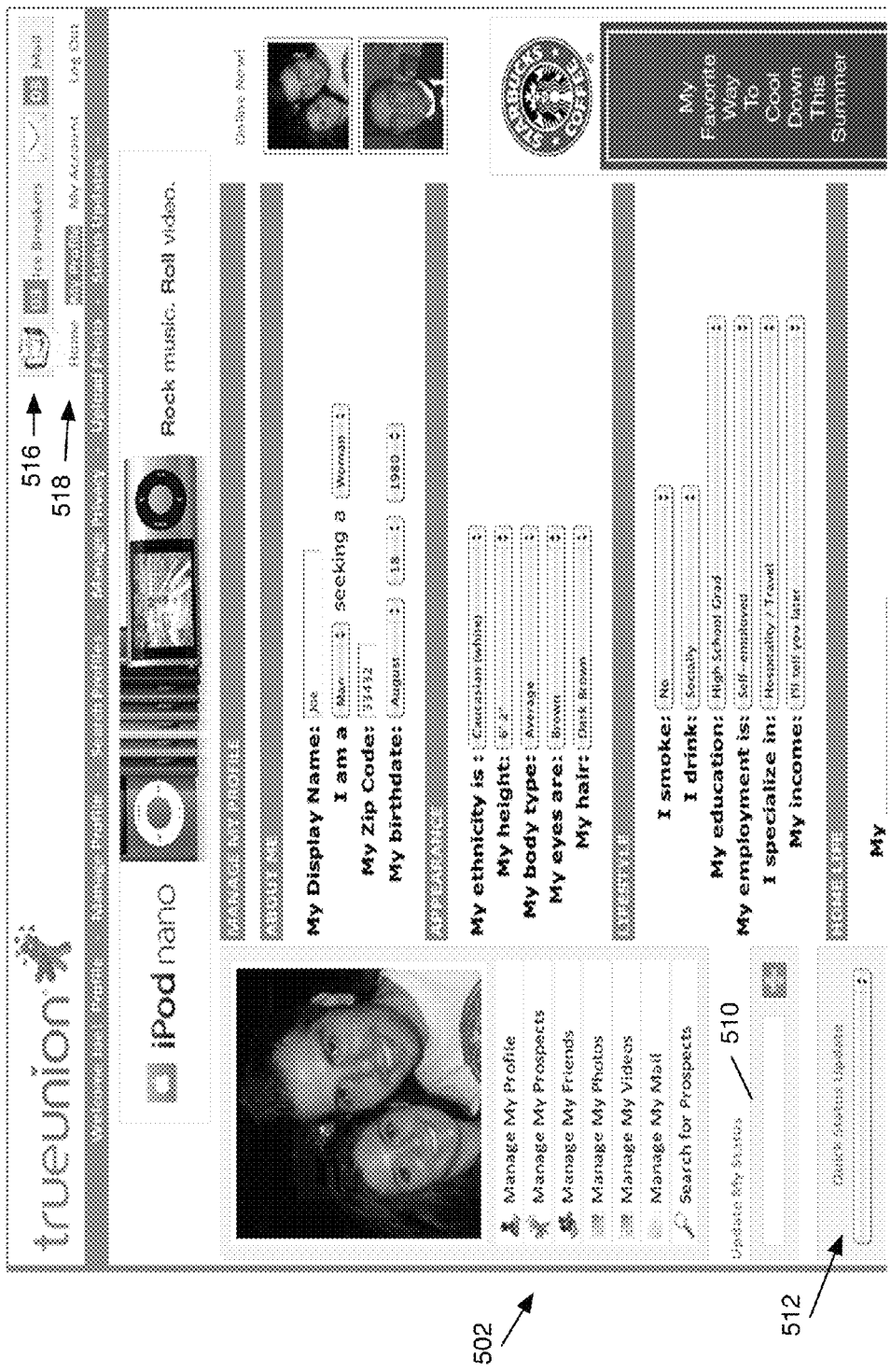
FIG. 8*a* is a first portion of an exemplary screen shot of a profile manager displayed to a dater.
Figure 8B:
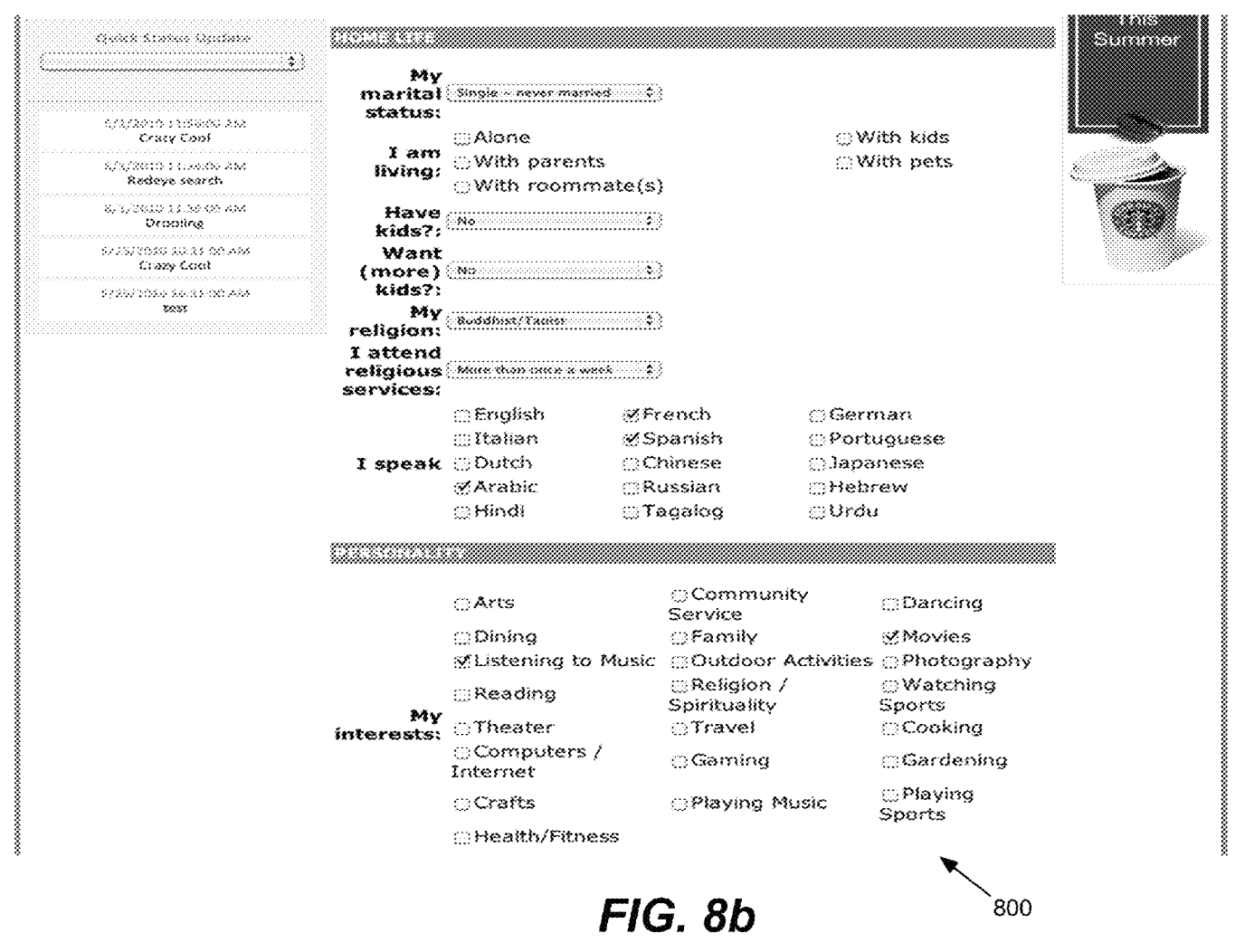

FIG. 8*a*-8*c* illustrate a profile manager 800, which may be accessed from the Manage My Profile component displayed in the dater dashboard screen 500. The profile manager 800 enables the dater 106 to specify and/or edit various aspects of the dater profile 118, including any of the following or other parameters or information: geographical parameters; appearance parameters; lifestyle parameters; home life parameters; personality parameters; interests information; political views; humor parameters; and occupation information.

Figure 9A:
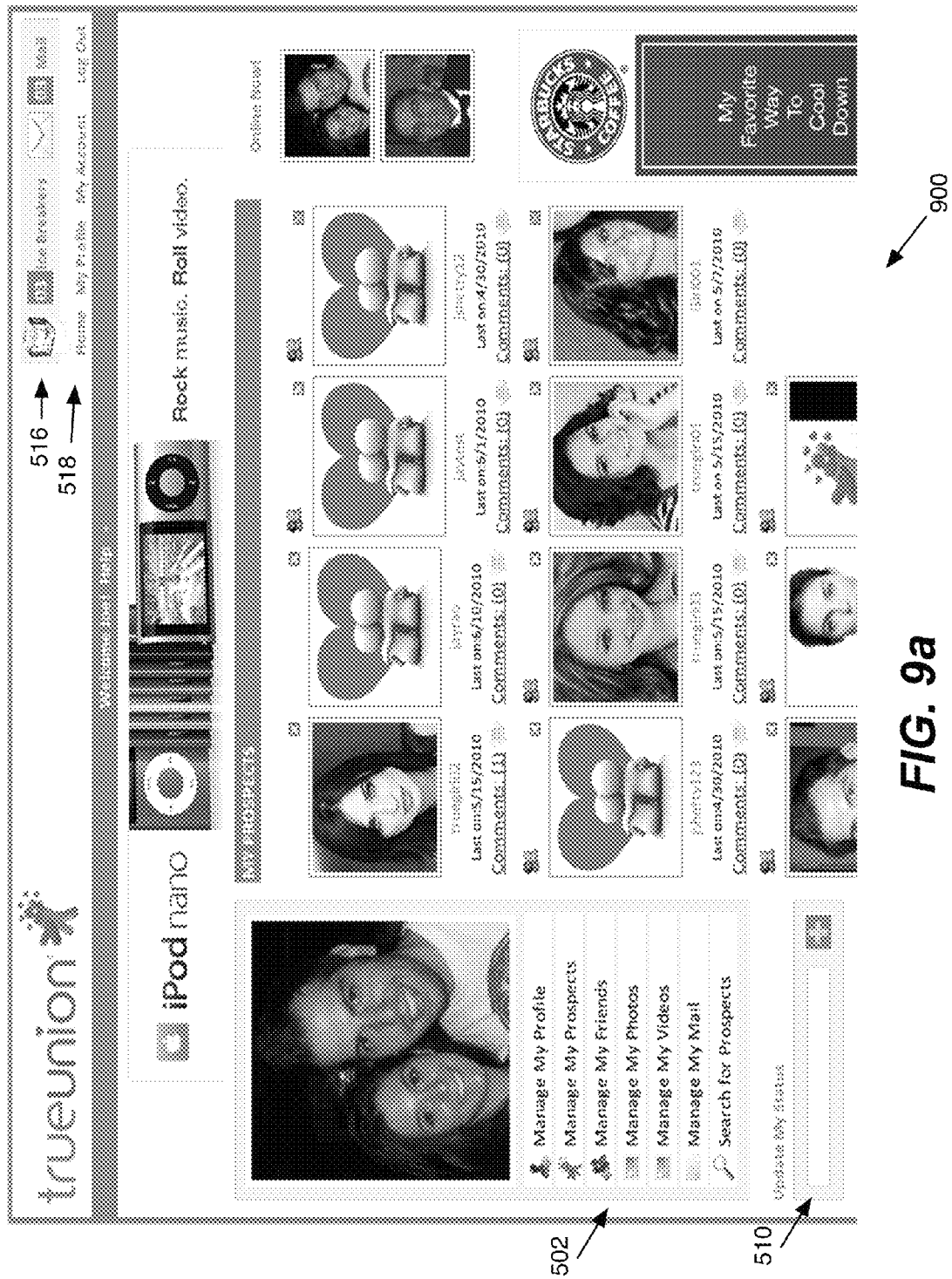
FIG. 9*a* is a first portion of an exemplary screen shot of a prospect manager displayed to a dater.
Figure 9B:
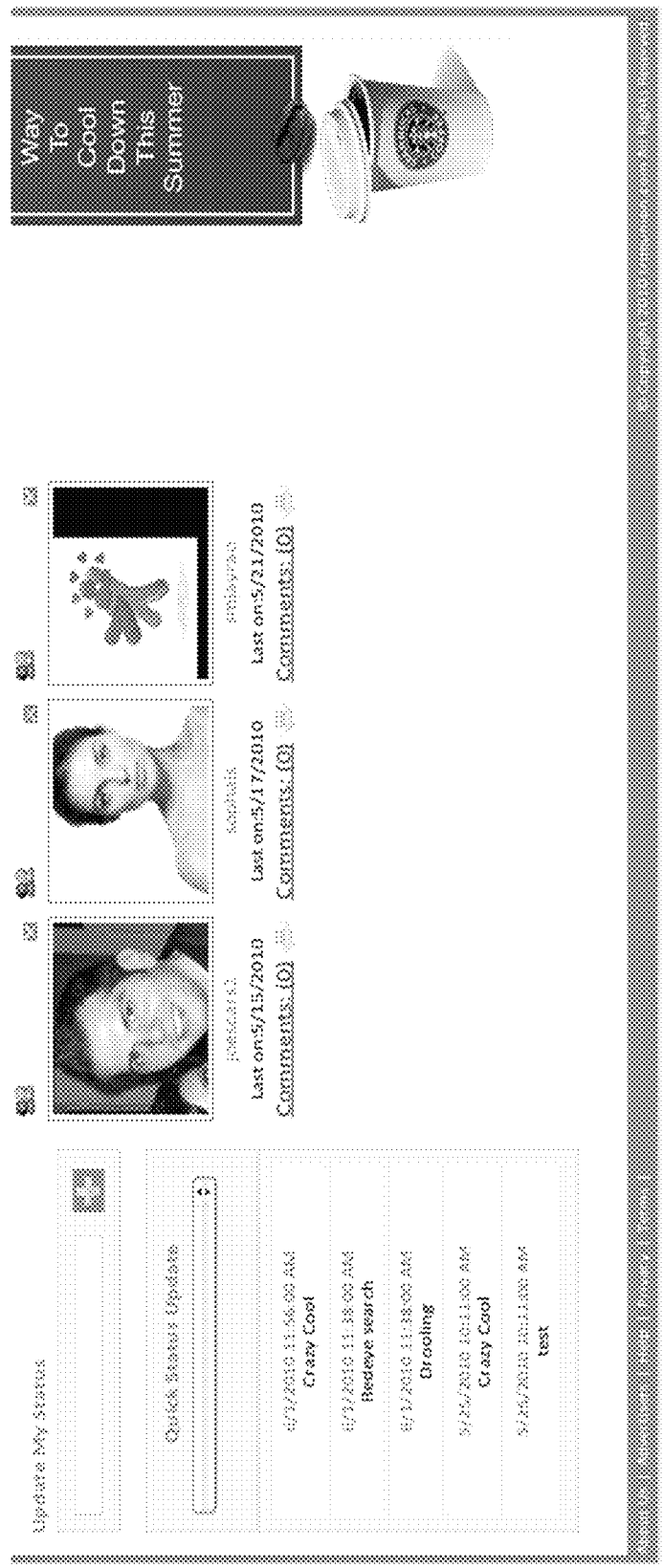
FIG. 9*b* is a second portion of the exemplary screen shot of FIG. 9*a*.

FIGS. 9*a* & 9*b* illustrate a prospect manager 900 displayed to a dater 106. The prospect manager 900 displays a list of current prospects and enables the dater 106 to add new prospects or delete existing prospects.

Figure 10A:
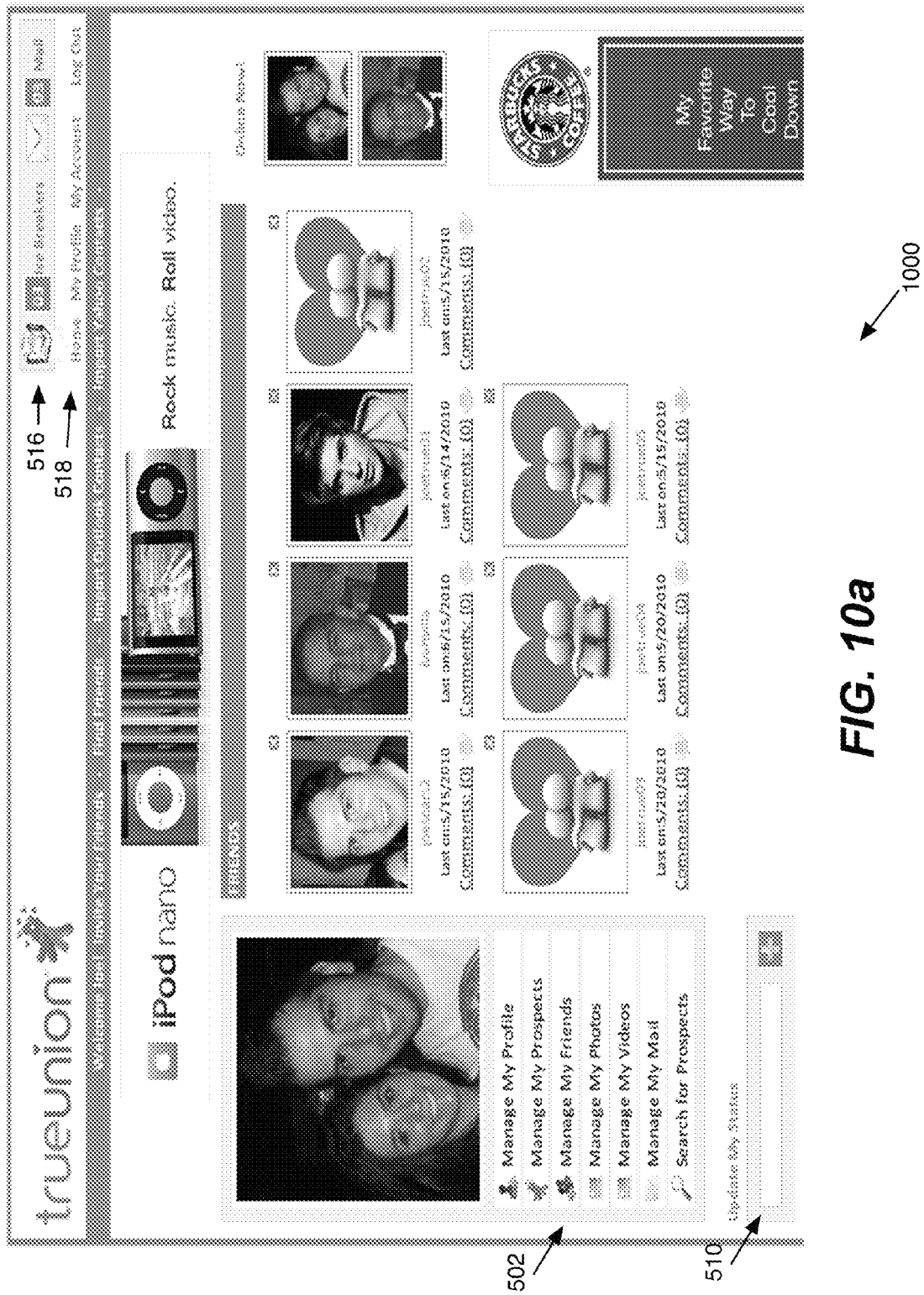
FIG. 10*a* is a first portion of an exemplary screen shot of a supporter manager displayed to a dater.
Figure 10B:
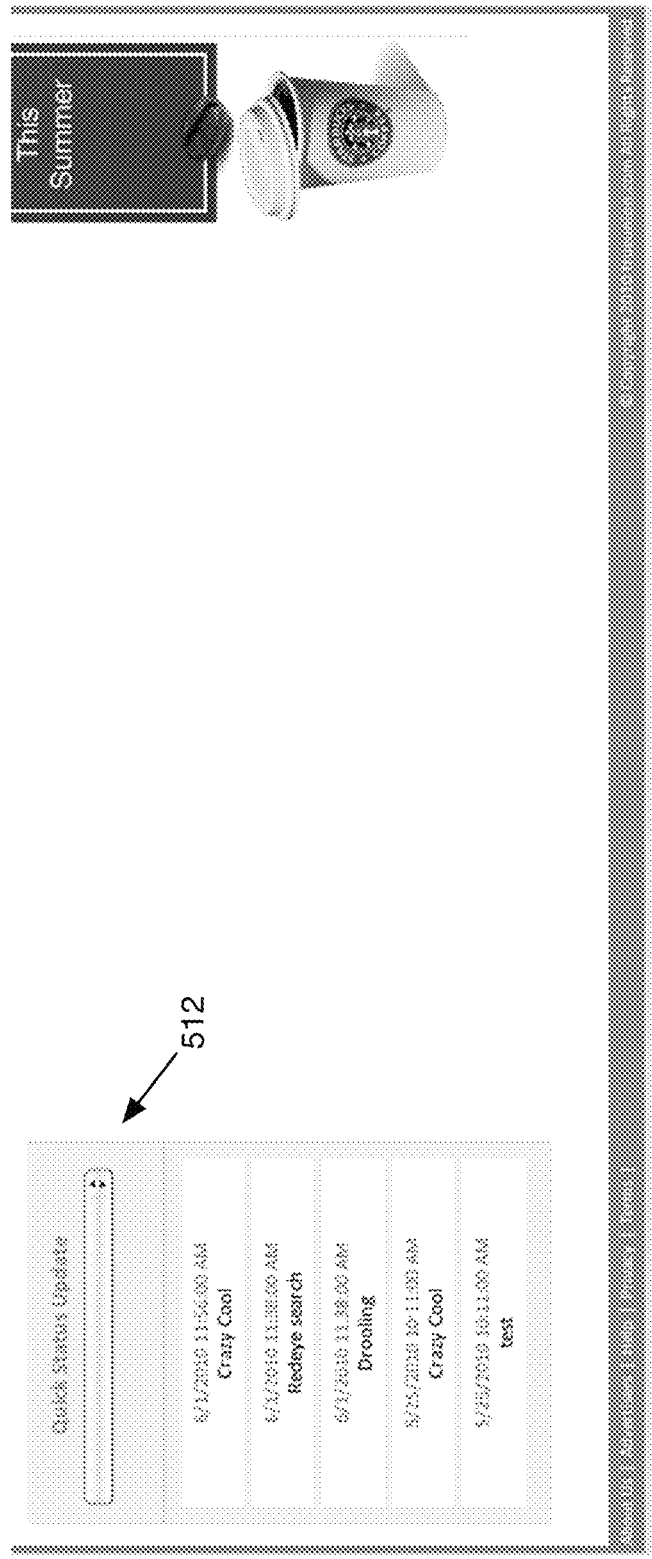
FIG. 10*b* is a second portion of the exemplary screen shot of FIG. 10*a*.

FIGS. 10*a* & 10*b* illustrate a supporter manager 1000 displayed to a dater 106. The supporter manager 1000 displays a list of current supporters 108 and enables the dater 106 to invite additional supporters 108 or delete existing supporters 108.

Figure 11A:
FIG. 11*a* is a first portion of an exemplary screen shot of a dater message inbox.
Figure 11B:
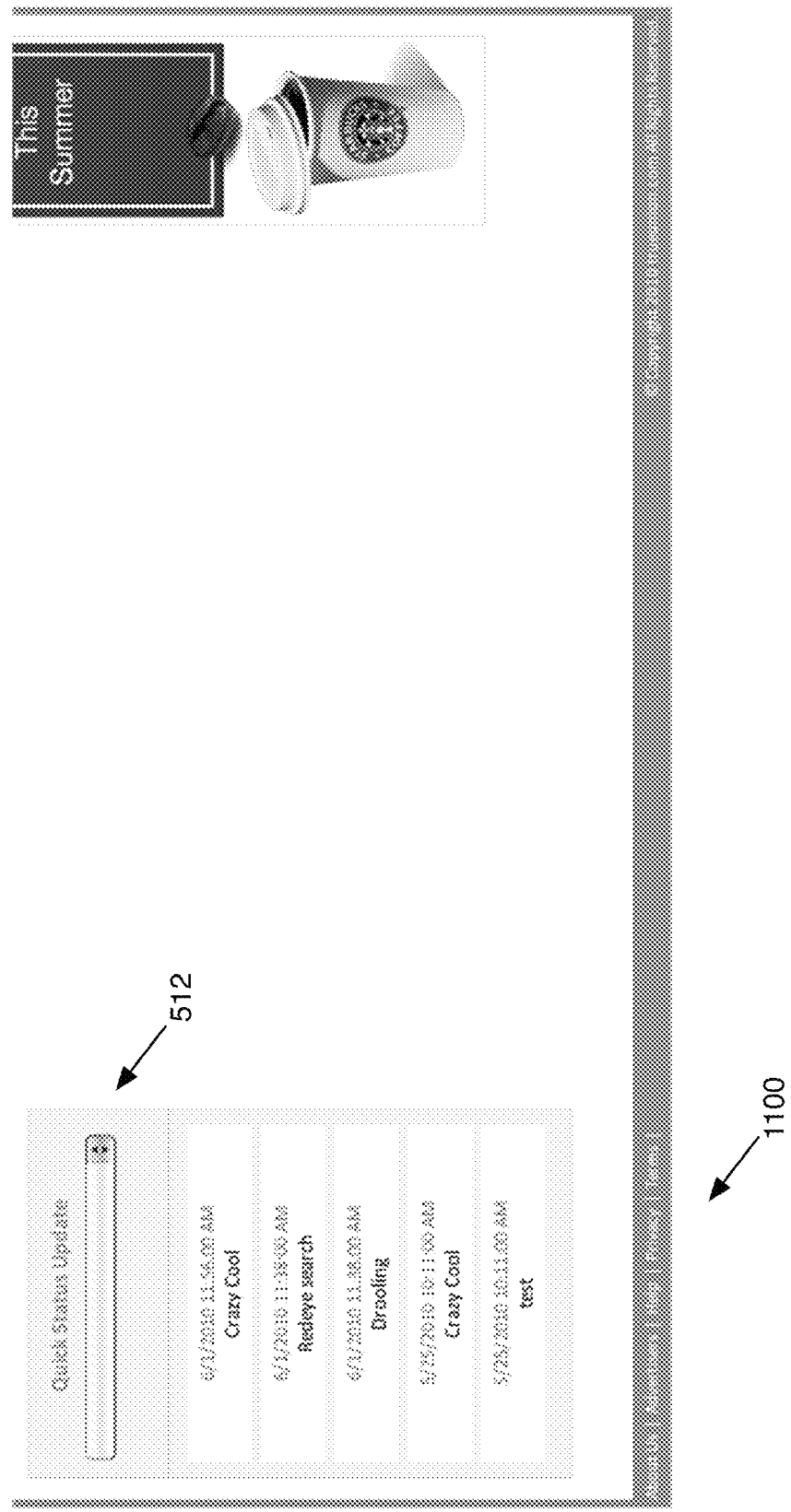
FIG. 11*b* is a second portion of the exemplary screen shot of FIG. 11*a*.
Figure 12A:
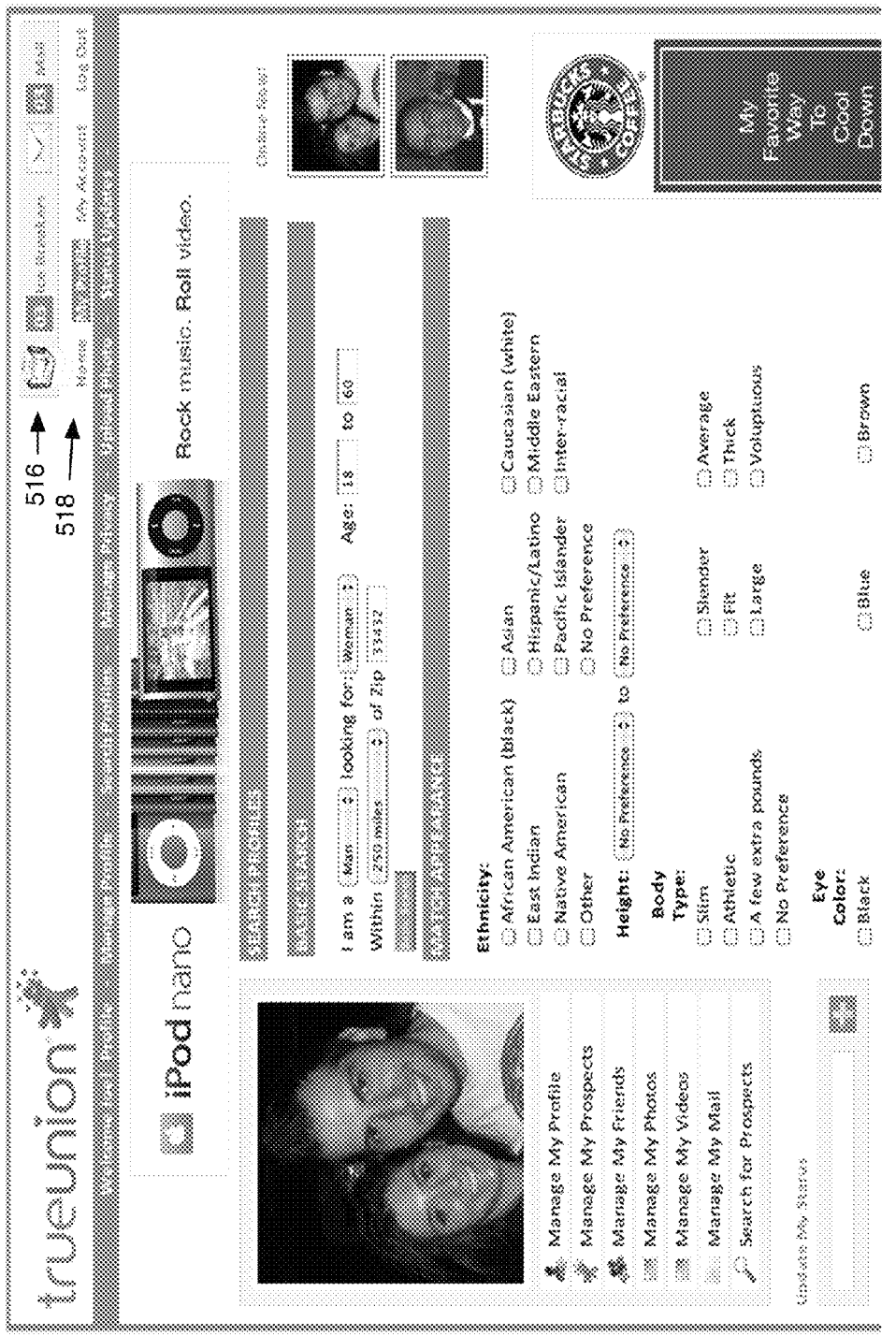
FIG. 12*a* is a first potion of an exemplary screen shot of a prospect search tool displayed to a dater.
Figure 12B:
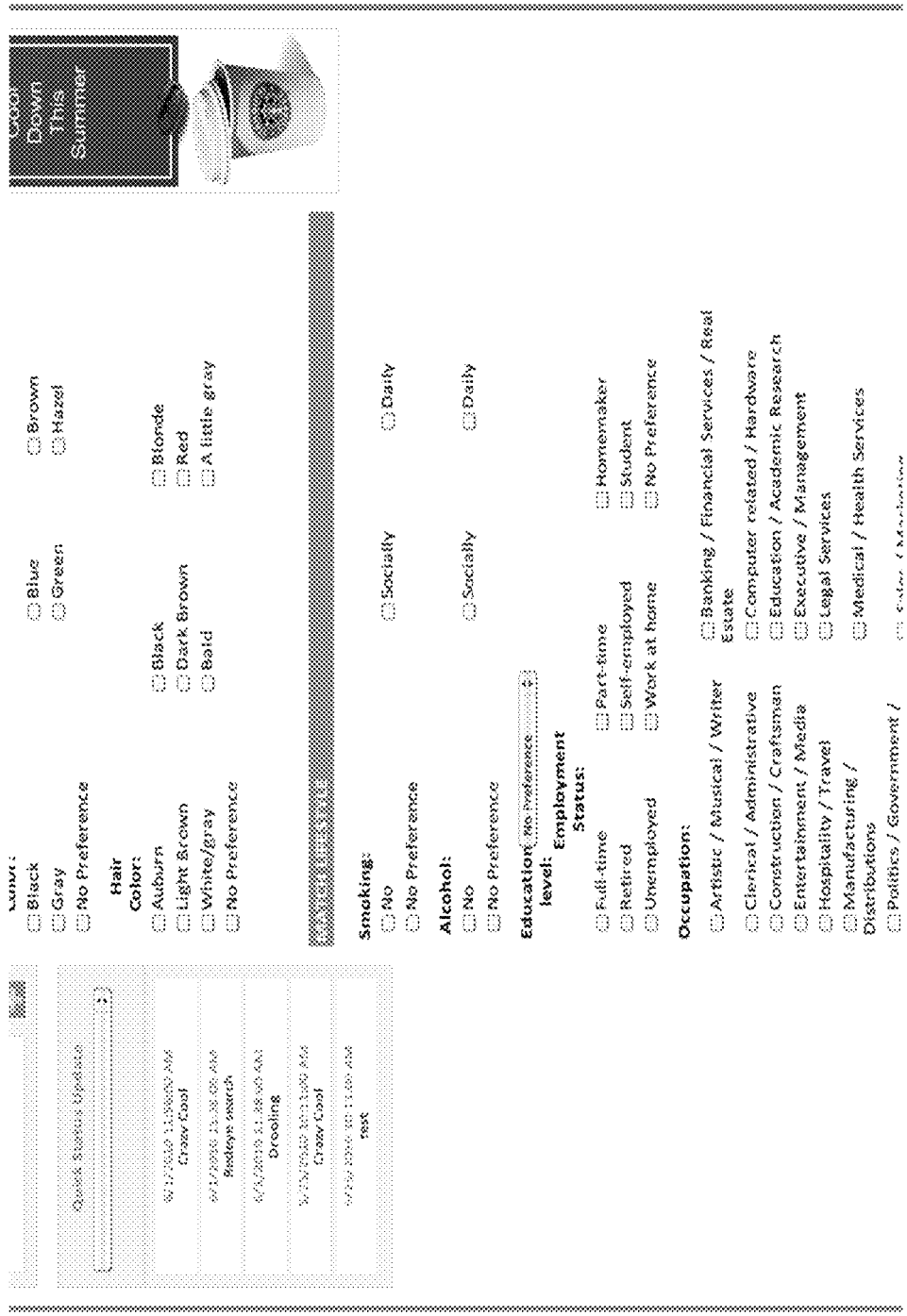

FIGS. 11*a* & 11*b* illustrate a dater message inbox 1100, which functions as a central messaging console for the dater's communications with prospects and/or supporters.

FIGS. 12*a*-12*f* illustrate a prospect search tool 1200 displayed to a dater 106. The prospect search tool 1200 enables the dater 106 to manually search for additional prospects by specifying any of the types of parameters or information described above. The matching engine 114 identifies prospects matching the search criteria and displays adds them to the list of current prospects.

Figure 13A:
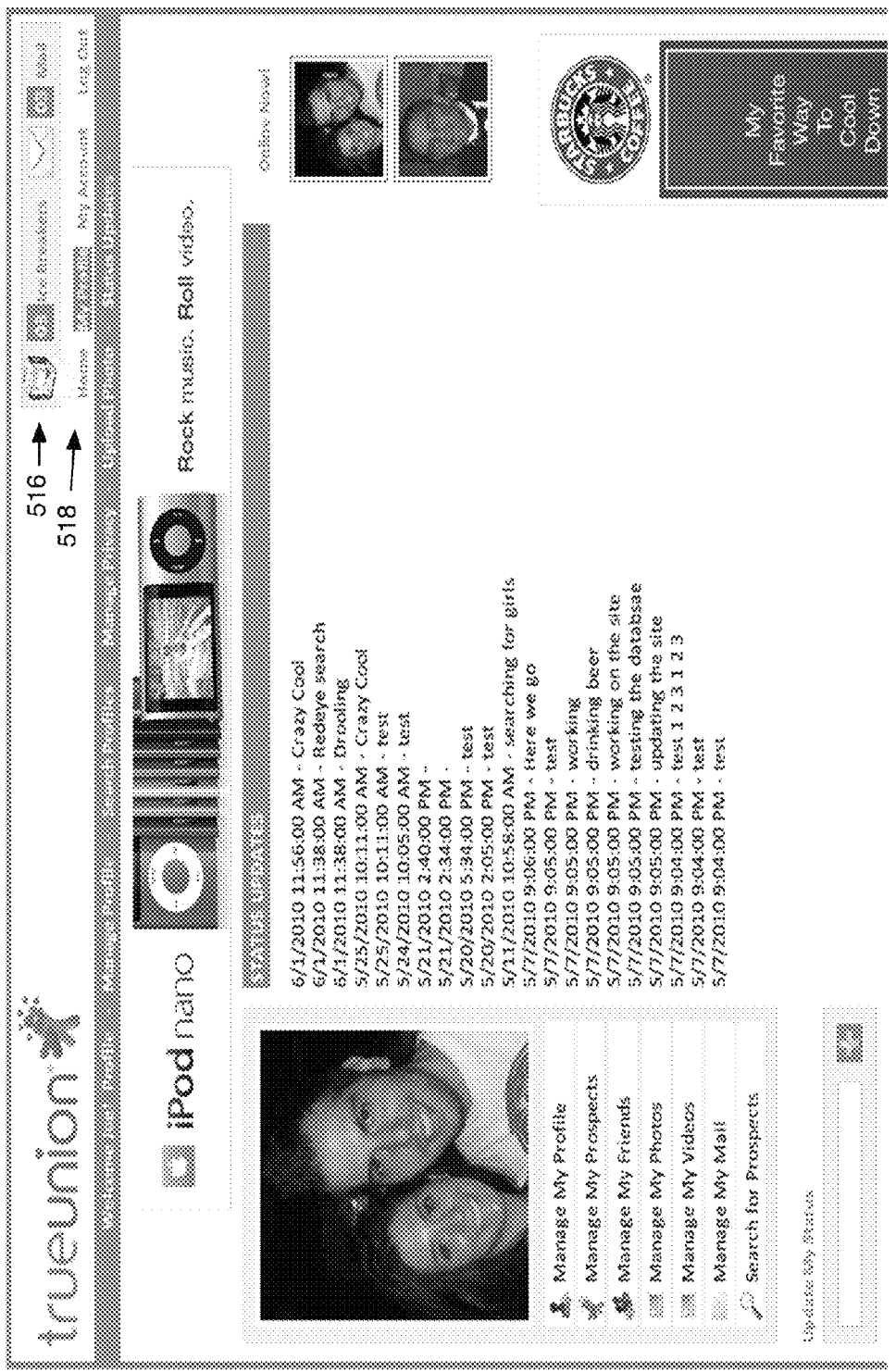
FIG. 13a is a first portion of an exemplary screen shot displaying dater status updates.
Figure 13B:
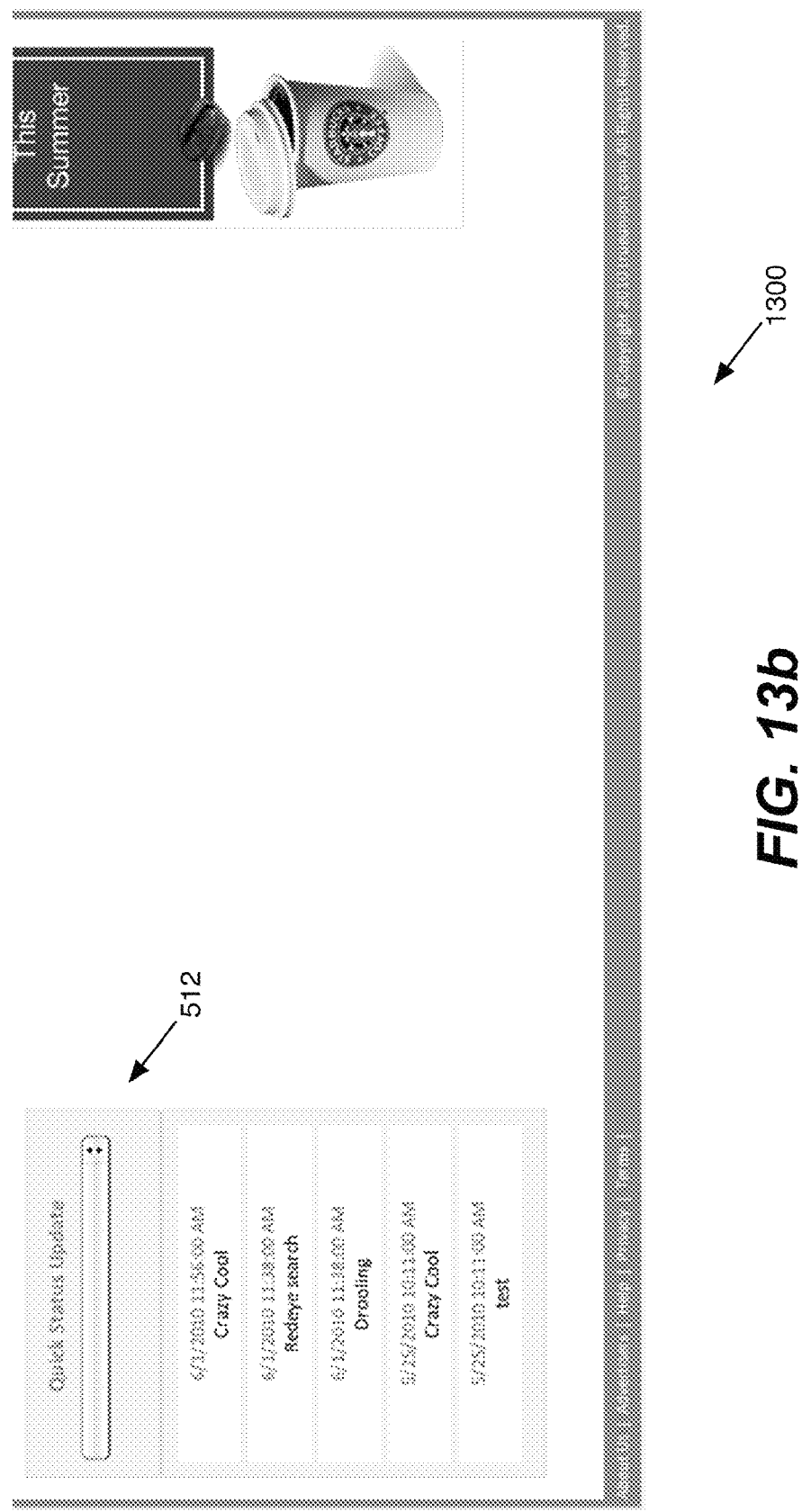

FIGS. 13*a* & 13*b* illustrate a dater status updates screen 1300, which logs the status updates entered via the status update entry component 510 or the quick status selection component 512. The dater status updates screen 1300 may display the status update display feed 514 or any other information or feeds associated with the dater profile 118.

Figure 14A:
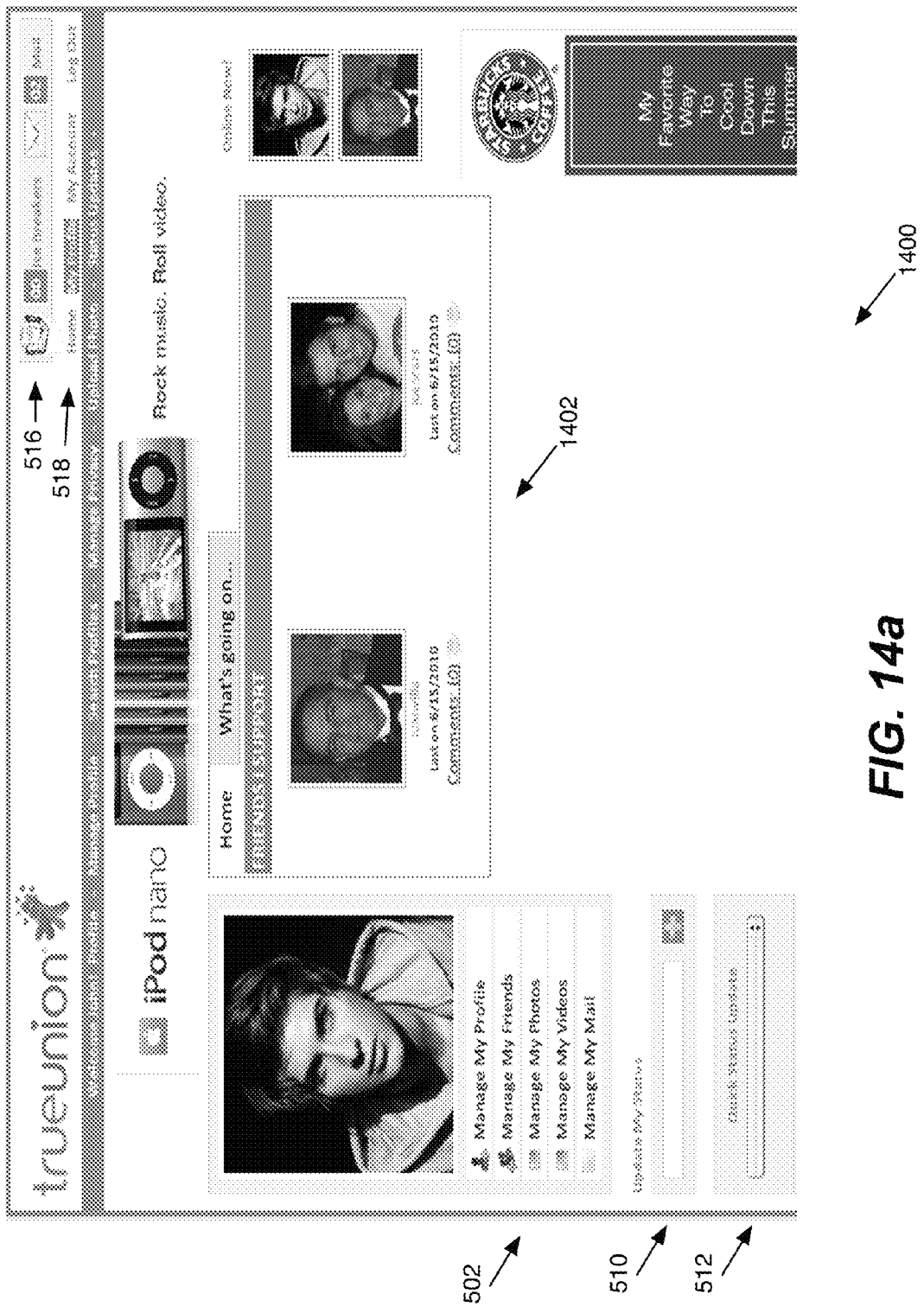
FIG. 14a is a first portion of an exemplary screen shot of a supporter dashboard displayed to a supporter.
Figure 14B:
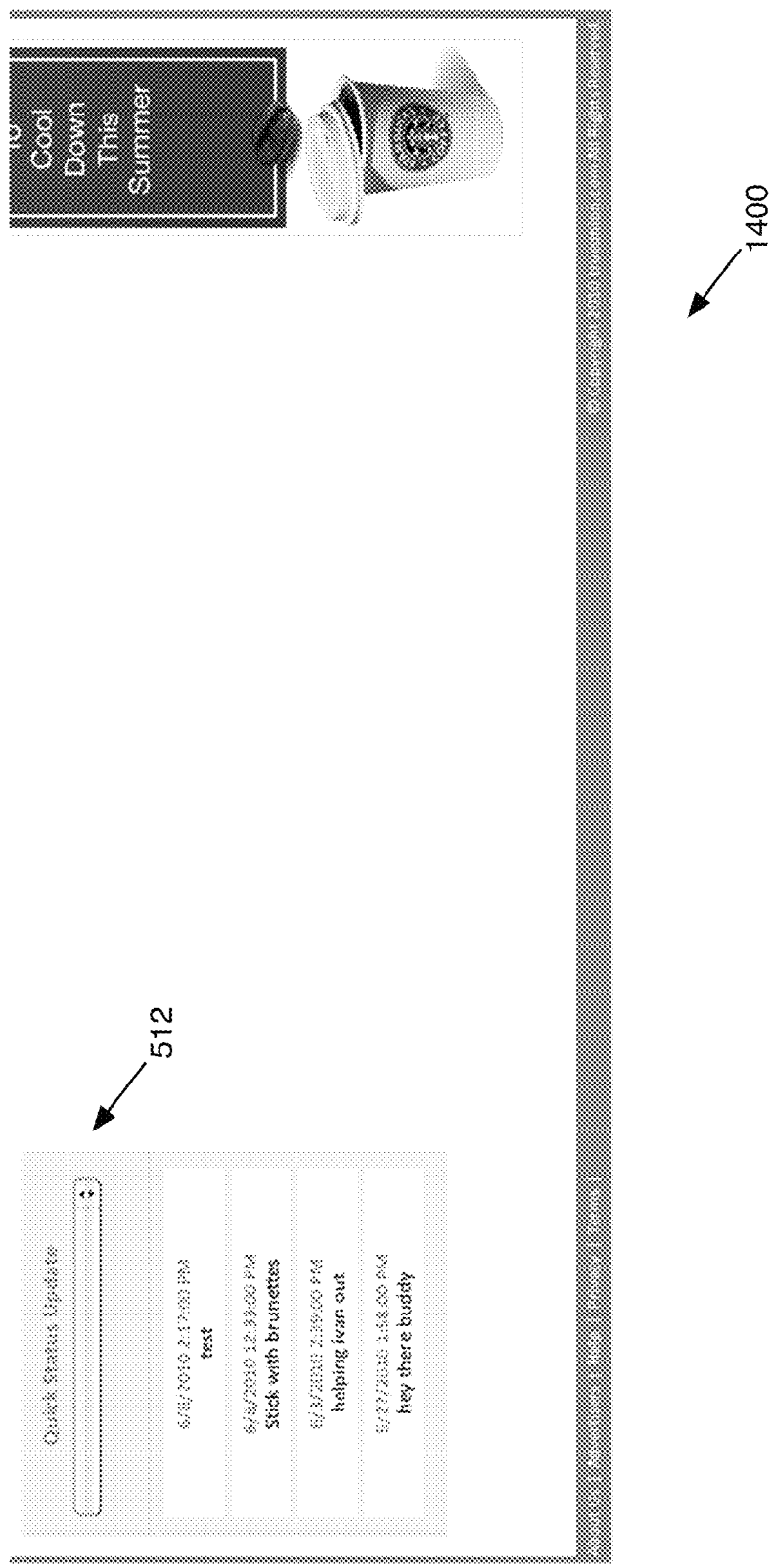
Figure 15:
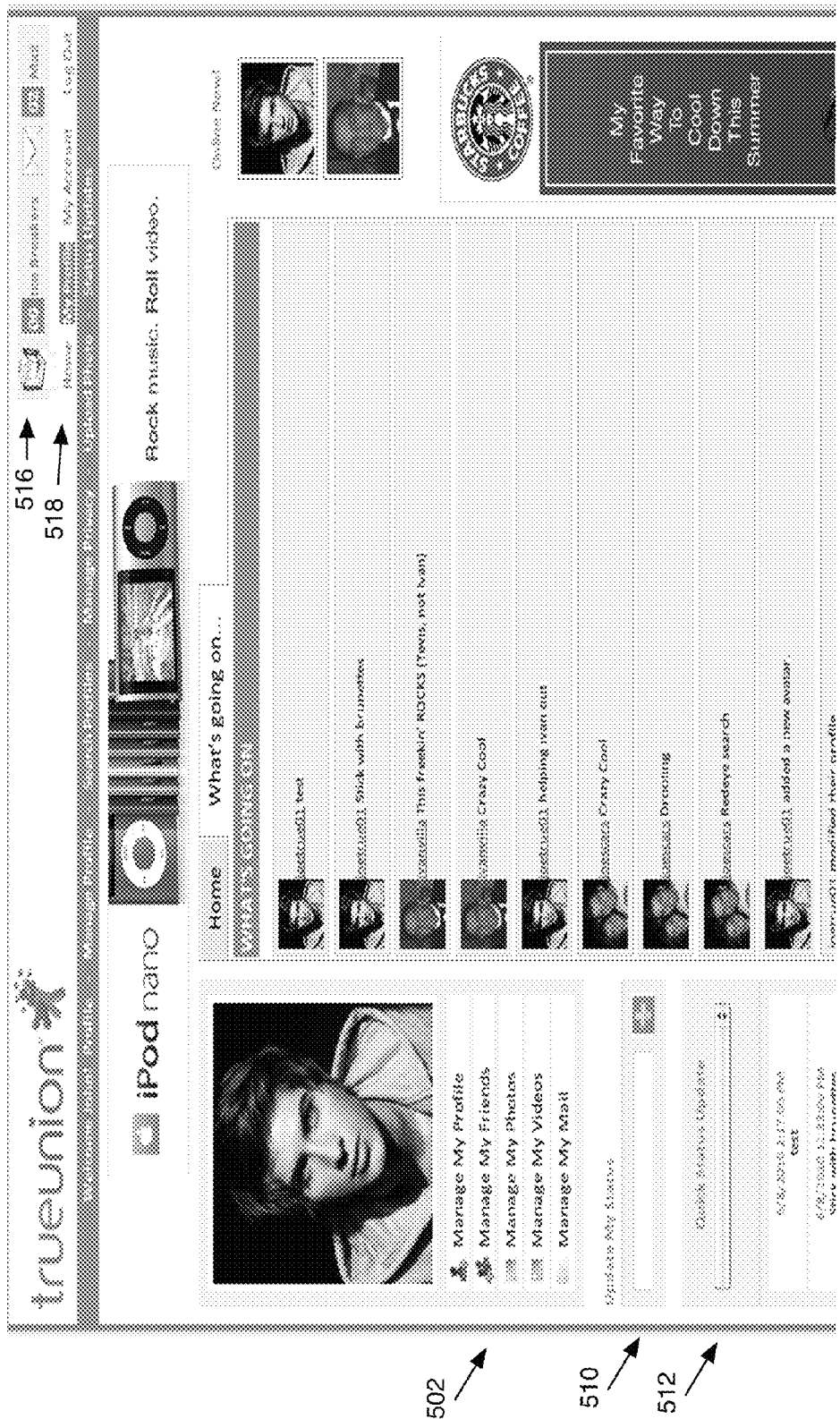
FIG. 15 is an exemplary screen shot of a data feed displayed to a supporter.

FIGS. 14*a*-18*c* illustrate various exemplary screen shots displayed to supporters 108. FIGS. 14*a* & 14*b* illustrate a supporter dashboard 1400 displayed to a supporter. The supporter dashboard 1400 may be generally configured in a similar manner as the dater dashboard 500 with a control menu 502, a status update entry component 510, a quick status selection component 512, a status update display feed 514, a notification bar 516, and a navigation bar 518. A Friends I Support display 1402 displays the daters 106 being supported by the supporter 108. FIG. 15 illustrates a data feed 1502 associated with the supporter 108, which may be configured in a manner similar to the dater's data feed.

Figure 16A:
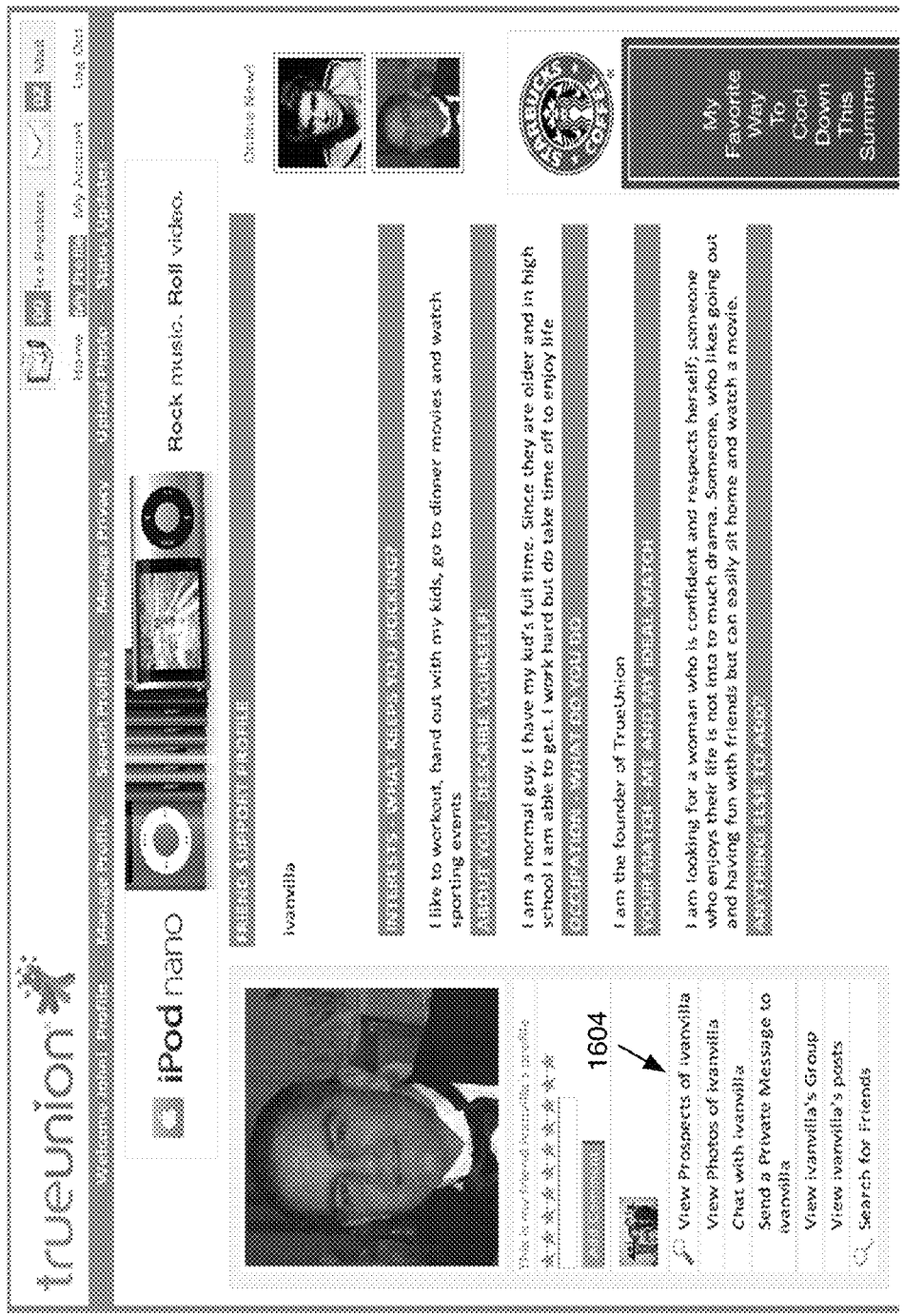
FIG. 16a is a first portion of an exemplary screen shot of a dater profile displayed to the associated supporter.
Figure 16B:
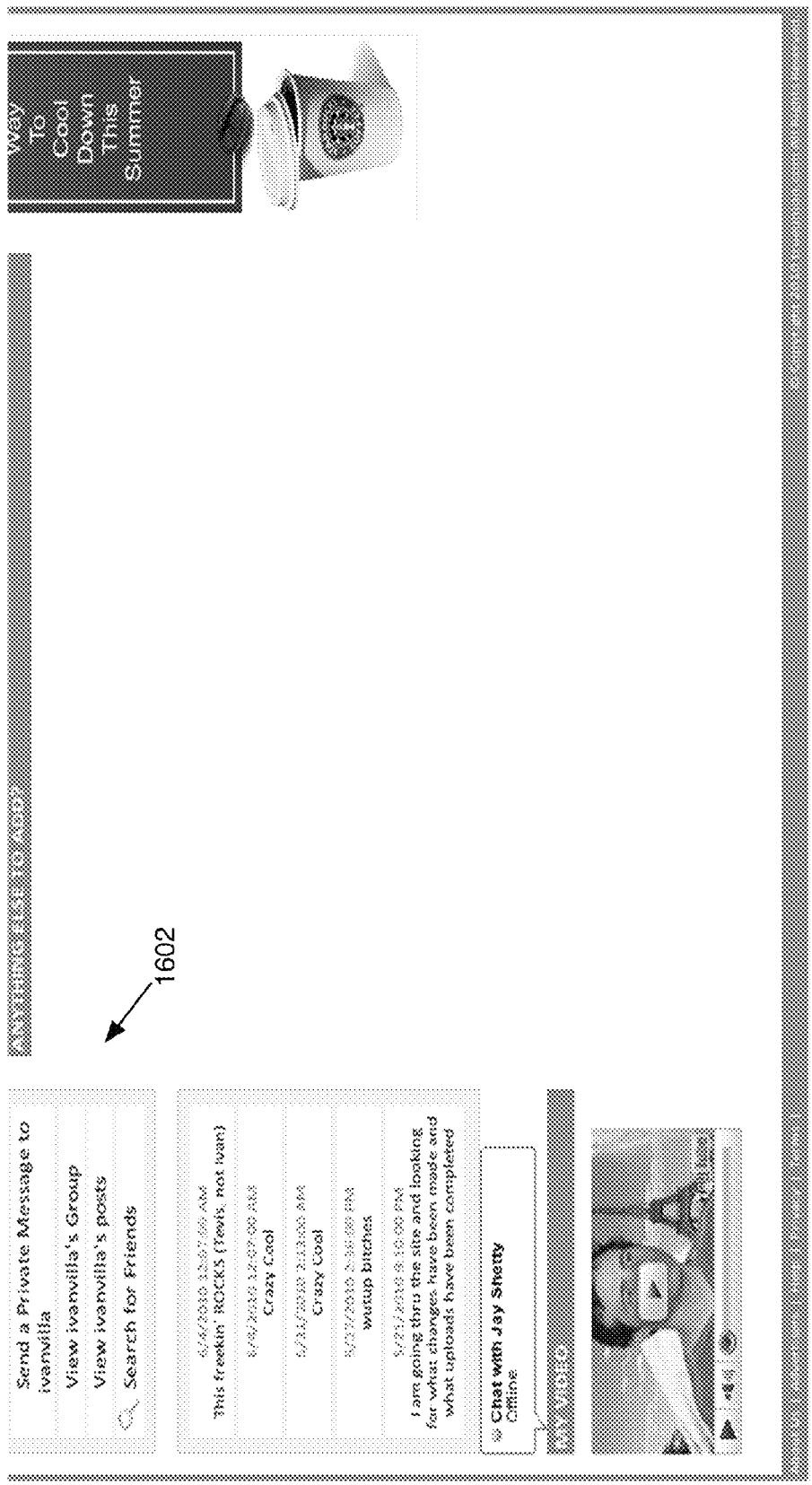
Figure 17A:
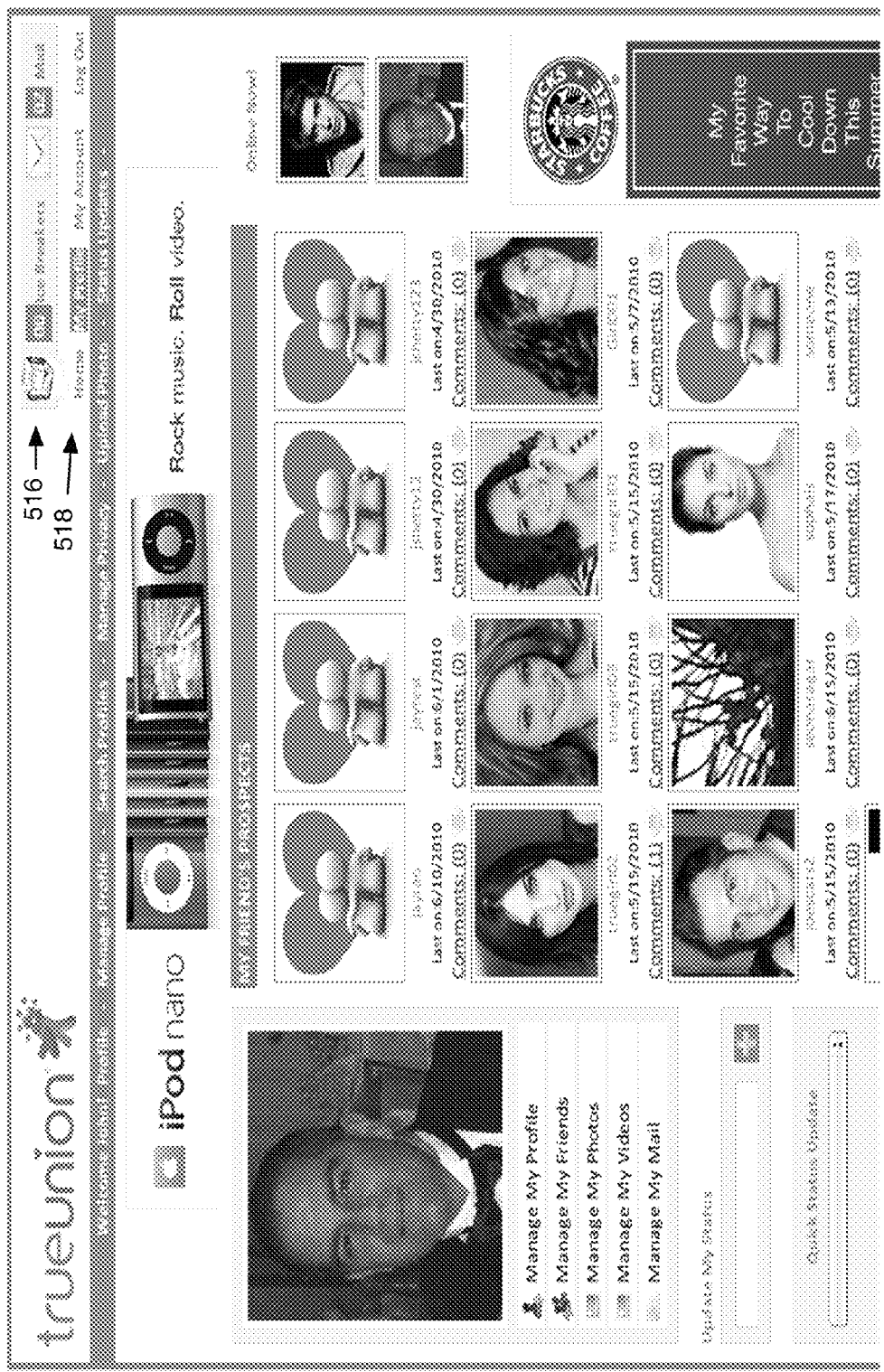
FIG. 17a is a first portion of an exemplary screen shot displaying dater prospects to the associated supporter.
Figure 17B:
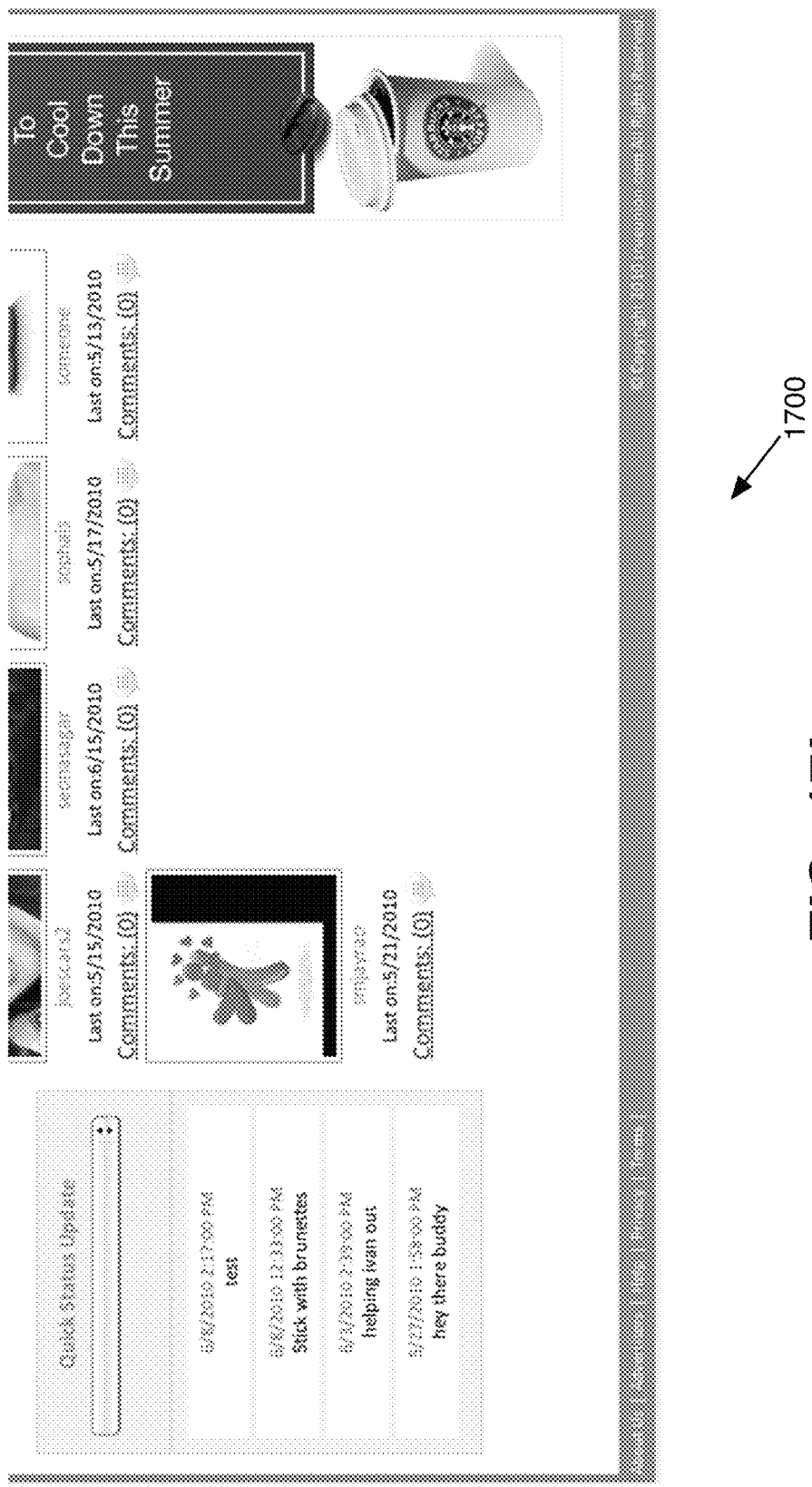

A supporter 108 may select a particular dater 106 to view information about the dater (e.g., dater profile 1600—FIGS. 16*a* & 16*b*). A control menu 1602 may display various tools for receiving information about or interacting with the dater 106. The supporter may view photos of the dater 106, chat with the dater 106, send a private message, view the dater's status updates, or view prospects via a component 1604. Upon selecting the component 1604, the dater's prospects may be displayed to the supporter 108 (dater prospects screen 1700—FIGS. 17*a* & 17*b*).

Figure 18B:
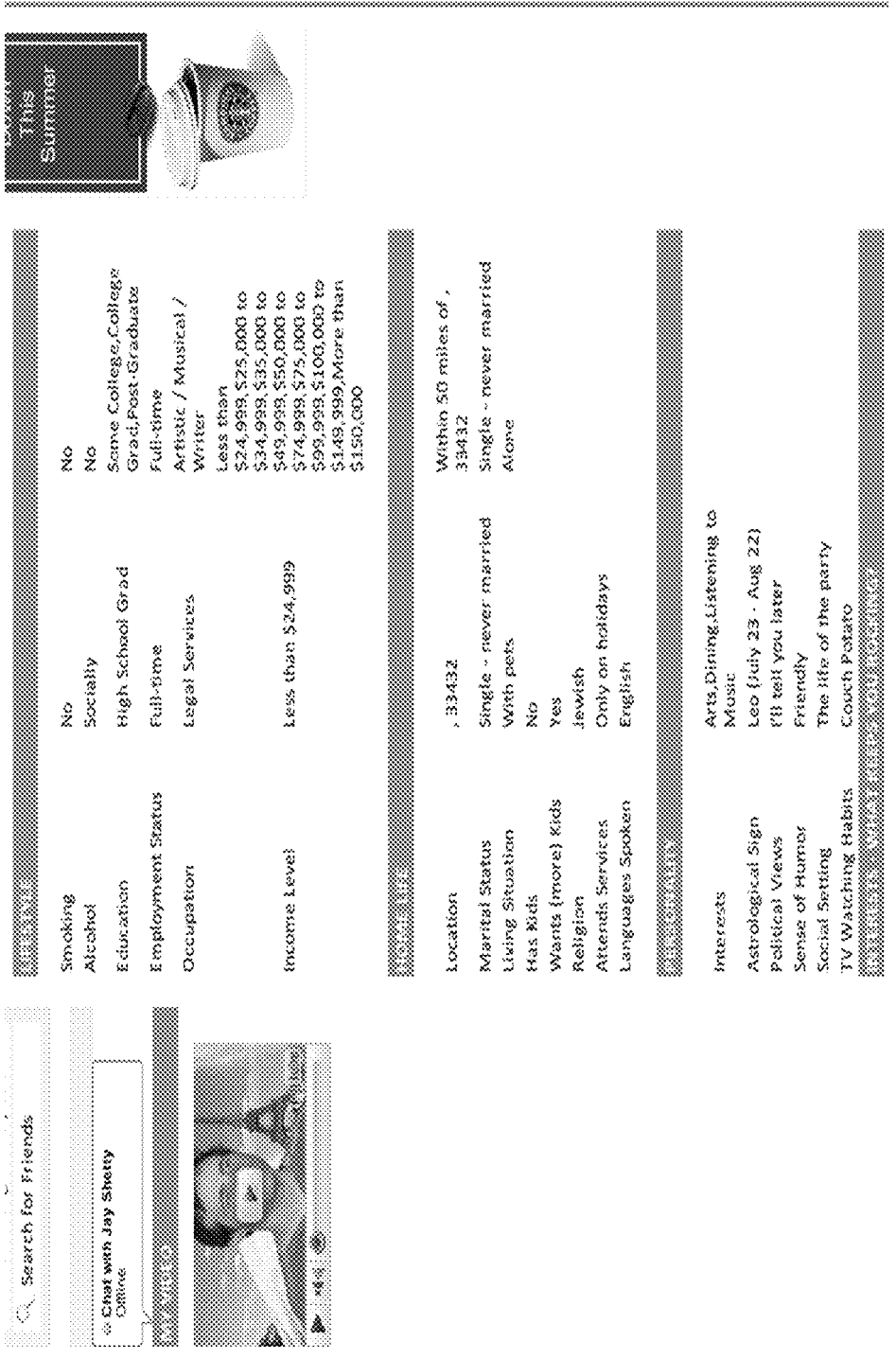
Figure 18C:
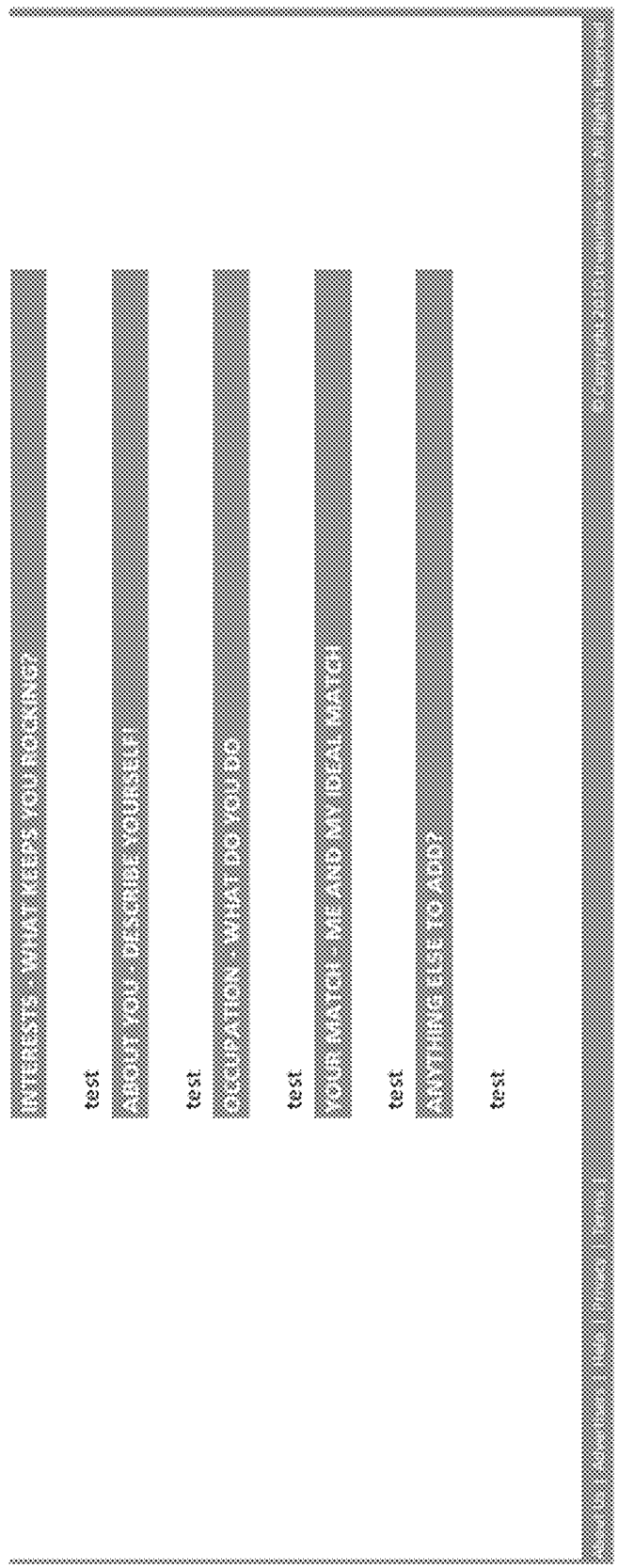

The supporter 108 may select any particular prospect to view additional information about the prospect. FIGS. 18*a*-18*c* illustrate a prospect profile screen 1800 displayed to the supporter 108. The prospect profile screen 1800 may be similar to the screen 700 displayed to the dater 106, including the ranking component 702 and the comment input component 704. The ranking component 702 enables the supporter 108 to submit a ranking or rating for the displayed prospect. Supporter rankings and ratings may be aggregated by the online dating platform 102 and displayed to the dater 106 in screen 700. It should be appreciated that various additional input mechanisms may be employed to enable the supporter 108 to provide feedback to the dater 106 about the prospects.

As mentioned above, the online dating platform 102 may be configured to support various social networking features for sharing information between daters 106 and supporters 108. As illustrated in FIG. 19, the online dating platform 102 may comprise a social networking component 1902. The social networking component 1902 may implement any desirable social networking features, functions, architectures, nomenclature, communication channels, technologies, etc., which may interface with commercially available social networks, such as, but not limited to, Facebook, MySpace, LinkedIn, and any other like databases, systems, or services knows as of this writing and which may become available in the future.

Figure 20:
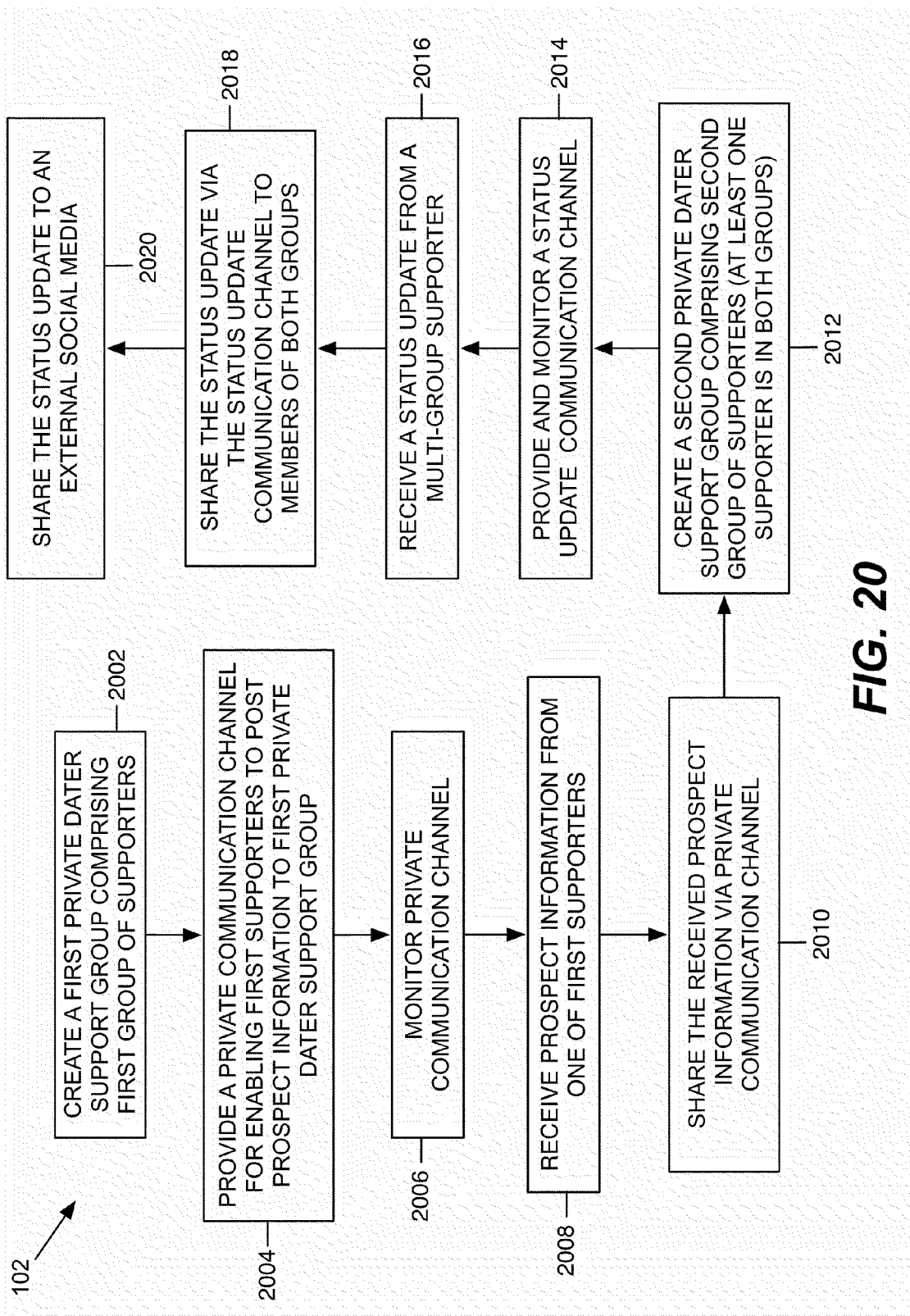
FIG. 20 is a flowchart illustrating an embodiment of a method for sharing information between supporters and daters in the online dating platform of FIG. 1.

In the embodiment illustrated in FIGS. 19 & 20, the social networking component 1902 supports a private communication channel 1906 and a "public" status update communication channel 1904. It should be appreciated that alternative or additional communications channels (of a social networking variety or otherwise) may be employed, including, but not limited to, news feeds, private feeds, public feeds, chats, email, instant messaging SMS, or any other similar channel. The private communication channel 1906 manages and controls the sharing of private information between members of a private dater support group 300. The status update communication channel 1904 manages and controls the sharing of information as a conventional social networking update feed across multiple private support groups 300.

FIGS. 19 & 20 illustrate an example in which a first dater 106a creates a first private support group 300a, and a second dater 106b creates a second private support group 300b. As illustrated by reference line 1908, a supporter 108a1 (having a supporter identifier 306a1) is a member of both private support groups.

Referring to the flowchart of FIG. 20, at block 2002, the first private support group 300a is created comprising the supporter 108a1. The online dating platform 102 provides a private communication channel 1906 for enabling the members of the first private group 300a to post prospect information, such as, but not limited to, text-based comments, about the first dater's prospects (block 2004). The online dating platform 102 monitors the private communication channel 1906 (block 2006) and, at block 2008, receives prospect information from the supporter 108a1 via the private communication channel 1906. At block 2010, the online dating platform 102 shares the received prospect information with the other members of the first private dater support group 300a without sharing them with the second private dater support group 300b.

At block 2012, the second private support group 300b associated with the second dater 106b is created, of which the supporter 108a1 is also a member. The online dating platform 102 provides the status update communication channel (at block 2014) to the supporter 108a1. At block 2016, the online dating platform 102 receives a status update from the supporter 108a1. Because the information is not received via the private communication channel 1906 but instead by the "public" status update communication channel 1904, at block 2018, the online dating platform 102 shares the status update to members of both private dater support groups 300a and 300b. In this manner, the online dating platform 102 may maintain the privacy of communications about the respective dating experiences while also supporting a conventional social networking experience.

It should be appreciated that one or more of the process or method descriptions associated with the flowcharts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the multi-platform virtual conference location system. Furthermore, the logical functions may be embodied in any computer readable medium for use by or in connection with an instruction execution system, apparatus, or device, such as a computer-based system, processor-containing system, or other system associated with the multi-platform virtual conference location system that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention. For example, the private support group functionality described herein may be implemented in any social networking context.

What is claimed is:

1. A method for sharing information in an online dating computer system, the method comprising:

receiving first dater registration information with an online dating computer system;

creating a first dater profile with the first dater registration information;

storing the first dater profile in a database;

a matching engine generating a plurality of prospects for the first dater which match the first dater profile, each of the plurality of prospects having a corresponding second dater profile stored in the database;

sending messages for inviting one or more supporters to a private dater support group;

creating the private dater support group in memory;

receiving one or more requests originating from the private dater support group to access at least a portion of information stored in the plurality of second dater profiles associated with the prospects matching the first dater profile;

granting access, in response to the one or more requests, to at least a portion of information stored in the plurality of second dater profiles associated with the prospects matching the first dater profile;

displaying a list of second dater profiles associated with the prospects matching the first dater profile;

receiving a selection for one of the second dater profiles from a member in the private dater support;

displaying the selected second dater profile, the second dater profile comprising a photograph of a person, a field for receiving a comment about the selected dater profile, and a selectable ranking component that enables the supporter to submit a ranking of the selected second dater profile, the ranking comprising a value corresponding to how strong a member believes the selected second dater profile matches the first dater profile;

receiving information from one or more members of the private dater support group about at least one of the prospects; and generating a message for presenting the received information on a display device, the received information comprises at least one of a rating for, or a comment about, at least one of the prospects, the received information being restricted from the plurality of prospects while being available to the first dater and all of the supporters.

2. The method of claim 1, wherein the received information is presented in a social networking feed to the first dater and the one or more supporters.

3. The method of claim 1, wherein the private dater support group comprises a social networking component.

4. An online dating computer system comprising:
a server configured to communicate with one or more computing devices via a communication network, the server comprising a processor and a memory;
an online dating matching component embodied in the memory and executed by the processor, the online dating matching component configured to provide a matching service for online dater data and further configured to enable communications among online dater profiles established in memory; and
a dater support component embodied in the memory and executed by the processor, the dater support component configured to provide dating assistance to profiles of online daters, via the online dating computer system, from messages originating from a dater support group associated with a first online dater, the dater support group comprising one or more invited supporter profiles, the messages originating from the dater support group comprising information about at least one prospect from one or more invited supporters; the dater support component generating a message for presenting the information on display device, wherein the information further comprises at least one of a rating for, or a comment about, at least one of the prospects, the information being restricted from a plurality of prospects while being available to the first online dater and members of the dater support group, the dater support component displaying a list of prospects matching the first online dater; the dater support component receiving a selection for one of the prospects from a member of the dater support group; the dater support component displaying the selected prospect, the selected prospect comprising a photograph of a person, a field for receiving a comment about the selected prospect, and a selectable ranking component that enables the supporter to submit a ranking of the selected second dater profile, the ranking comprising a value corresponding to how strong a member believes the selected prospect matches the first online dater.

5. The online dating computer system of claim 4, wherein the dater support component is further configured to send messages to the invited supporter profiles of a first dater profile to access at least a portion of stored information in the first dater's prospect profiles.

6. The online dating computer system of claim 4, further comprising a social networking update feed that enables the invited supporters to provide status updates to a social network.

7. A method for sharing information in an online dating platform, the method comprising:
creating a first private dater support group comprising a profile of a first dater and a first group of one or more profiles of supporters invited by the first dater to provide dating assistance;
an online dating computer system providing a private communication channel for enabling the profiles of the first group of supporters to provide prospect information about a first group of prospects associated with a profile of the first dater;
the online dating computer system monitoring the private communication channel;
the online dating computer system displaying a list from the group of prospects associated with a profile of the first dater profile via the private communication channel;
receiving a selection from a first profile of the first group of supporters over the private communication channel for a first prospect of the group of prospects from a member in the private dater support;
displaying the selected first prospect via the private communication channel to the first profile of the first group of supporters, the selected first prospect comprising a photograph of a person, a field for receiving a comment about the selected dater profile, and a selectable ranking component that enables the first profile of the first group of supporters to submit a ranking of the selected first prospect, the ranking comprising a value corresponding to how strong the first profile of the first group of supporters believes the selected first prospect matches the first dater profile;
receiving from the first profile of the first group of supporters via the private communication channel the prospect information about the first prospect associated with the profile of the first dater;
sharing the received prospect information via the private communication channel with the profile of the first dater and profiles of the first group of supporters, wherein the received information comprises at least one of a rating for, or a comment about, at least one of the prospects, the received information being restricted from the plurality of prospects while being available to the first dater and all of the supporters.

8. The method of claim 7, wherein the sharing the received prospect information comprises generating a private feed.

9. The method of claim 8, further comprising displaying the private feed in a graphical user interface.

10. The method of claim 7, further comprising:
creating a second private dater support group comprising a profile of a second dater and a second group of profiles for one or more supporters invited by the profile of the second dater to provide dating assistance, wherein the first profile of the first group of supporters is one from the second group of supporters;
the online dating computer system providing and monitoring a status update communication channel;
receiving a status update, from the first profile of the first group of supporters, on the status update communication channel; and
sharing the received status update from the first profile of the first group of supporters via the status update communication channel with the profile of the first dater, the other profiles of the first group of supporters, the profile of the second dater, and the profiles for the second group of supporters.

11. The method of claim 10, wherein the status update communication channel comprises a social networking update feed.

12. The method of claim 10, wherein the sharing the received status update comprises displaying the received status update in a social networking status update feed displayed via a graphical user interface.

* * * * *